US011455761B2

(12) United States Patent
Waniguchi et al.

(10) Patent No.: US 11,455,761 B2
(45) Date of Patent: *Sep. 27, 2022

(54) INFORMATION DISPLAY SYSTEM AND INFORMATION DISPLAY METHOD

(71) Applicant: PANASONIC I-PRO SENSING SOLUTIONS CO., LTD., Fukuoka (JP)

(72) Inventors: Kazuya Waniguchi, Fukuoka (JP); Masahiro Hisayama, Tokyo (JP); Kensuke Ozawa, Saitama (JP); Youhei Koide, Fukuoka (JP)

(73) Assignee: PANASONIC I-PRO SENSING SOLUTIONS CO., LTD., Fukuoka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/329,791

(22) Filed: May 25, 2021

(65) Prior Publication Data

US 2021/0279926 A1 Sep. 9, 2021

Related U.S. Application Data

(63) Continuation of application No. 15/414,282, filed on Jan. 24, 2017, now Pat. No. 11,049,298.

(30) Foreign Application Priority Data

Oct. 7, 2016 (JP) .................................. 2016-199564

(51) Int. Cl.
*G06T 11/20* (2006.01)
*G08B 25/14* (2006.01)
(Continued)

(52) U.S. Cl.
CPC .............. *G06T 11/206* (2013.01); *G06N 7/00* (2013.01); *G06Q 50/01* (2013.01); *G06Q 50/26* (2013.01);
(Continued)

(58) Field of Classification Search
None
See application file for complete search history.

(56) References Cited

U.S. PATENT DOCUMENTS 7,855,935 B1 12/2010 Lauder et al.
9,129,219 B1 * 9/2015 Robertson ................ G06N 5/04
(Continued)

FOREIGN PATENT DOCUMENTS

JP 2007-158496 A 6/2007
JP 2009-206617 A 9/2009

OTHER PUBLICATIONS

Irman et al., "Processing Social Media Messages in Mass Emergency: A Survey," *ACM Computing Surveys* 47(4), Article 67, Jun. 2015. (38 pages).
(Continued)

*Primary Examiner* — Daniel C Puentes
(74) *Attorney, Agent, or Firm* — Seed IP Law Group LLP

(57) ABSTRACT

A crime prediction server accesses an SNS server, collects submission information, which includes crime-related terms, as crime-related information from the submission information of general citizens, calculates statistical data for each attribute, which includes an occurrence place, a crime occurrence hour, a crime type of a crime, for the crime-related information, and sends crime data and map data, which are extracted from the statistical data of the crime-related information, in response to a request from a center device. The center device superimposes the crime data on the map data for each attribute on a display, and plots and
(Continued)

displays the crime data in a position corresponding to the crime occurrence place on a map.

4 Claims, 19 Drawing Sheets

(51) Int. Cl.
| | |
|---|---|
| *G08B 31/00* | (2006.01) |
| *G06T 11/60* | (2006.01) |
| *G06Q 50/26* | (2012.01) |
| *G08B 13/196* | (2006.01) |
| *G06Q 50/00* | (2012.01) |
| *G06N 7/00* | (2006.01) |
| *H04N 7/18* | (2006.01) |

(52) U.S. Cl.
CPC ........ *G06T 11/60* (2013.01); *G08B 13/19682* (2013.01); *G08B 25/14* (2013.01); *G08B 31/00* (2013.01); *H04N 7/181* (2013.01)

(56) References Cited

U.S. PATENT DOCUMENTS 9,503,873 B1 11/2016 Yadav
9,536,191 B1 1/2017 Arel et al.

OTHER PUBLICATIONS

Perry et al., "Predictive Policing: The Role of Crime Forecasting in Law Enforcement Operations", Rand Corporation, pp. xiii-xxi and 14-20, 2013. (42 pages).

* cited by examiner

FIG. 16

| PLACE A | | | | | |
|---|---|---|---|---|---|
| | | TYPE | | | |
| | | HOMICIDE | BURGLARIES | ... | |
| TIME | MORNING | 3 | 0 | ... | |
| | AFTERNOON | 0 | 0 | ... | |
| | MIDNIGHT | 4 | 4 | ... | |

| PLACE B | | | | | |
|---|---|---|---|---|---|
| | | TYPE | | | |
| | | HOMICIDE | BURGLARIES | ... | |
| TIME | MORNING | 0 | 0 | ... | |
| | AFTERNOON | 0 | 1 | ... | |
| | MIDNIGHT | 2 | 3 | ... | |

⋮

INFORMATION DISPLAY SYSTEM AND INFORMATION DISPLAY METHOD

BACKGROUND

1. Technical Field

The present disclosure relates to an information display system and an information display method which collect and display incident information.

2. Description of the Related Art

In recent years, monitoring cameras are widespread which are utilized for crime prevention or the like by imaging prescribed indoor and outdoor monitoring areas in respective positions such as various facilities, buildings, factories, houses, and roads. In addition, in order to support works of police officers or security guards, examination is progressed for an operation of imaging videos of a site in such a way that the police officers or the security guards on duty wear or possess wearable cameras or in such a way that in-vehicle cameras are mounted in patrol cars or security vehicles. For example, in a police station, examination is performed on an operation of extracting imaging videos related to an incident as incident videos from videos imaged by imaging devices, such as the monitoring cameras, the wearable cameras, and the in-vehicle cameras, and using the extracted imaging videos for investigation. In addition, support of disposition of the police officers or the security guards using the imaging video imaged by the monitoring cameras and the like is under examination.

For example, Japanese Patent Unexamined Publication No. 2009-206617 discloses a crime prevention system using face authentication. In the crime prevention system of the patent document, the face authentication of an investigation target subject is performed by collating information image captured by a fixed camera device with facial information in an investigation target subject list database at an investigation management server, whereabout information of the investigation target subject is sent to a wireless base station, which is specified using positional information and time information in a case where it is possible to specify the investigation target subject, a security office terminal is specified based on the positional information of a mobile phone terminal in a case where facial information transmitted from the mobile phone terminal is collated with authenticated facial information and the pieces of facial information coincide with each other, and a fact that the investigation target subject is present near is notified to the security office terminal.

In addition, Japanese Patent Unexamined Publication No. 2007-158496 discloses a map interconnection video monitoring method and a device. The map interconnection video monitoring method and the device in the patent document calculate a range, in which a criminal may run, at every fixed time after an incident occurs, store video data from monitoring cameras installed in a plurality of places, calculate an expected passing time slot, through which the criminal passes, from the video data of the plurality of places corresponding to the range in which the criminal may run, and display video data in the expected passing time slot on a screen together with map data.

Here, it is assumed that incident information, such as an occurrence hour or an occurrence location of an incident, is utilized to predict an occurrence tendency of an incident and to dispose the police officer or the security guard at an in-station system of a police station or a security company. In this case, for example, if it is possible to use a plurality of pieces of incident information for each category, such as an occurrence type of an incident, accurate incident occurrence prediction or person disposition are possible.

In an example of the related art disclosed in Japanese Patent Unexamined Publication No. 2009-206617, it is possible to notify that an investigation target subject is present near using information of an image, which is captured by an investigation collaborator, from the mobile phone terminal. However, in the example of the related art disclosed in Japanese Patent Unexamined Publication No. 2009-206617, the notification is performed in a case where the investigation target subject is specified through the face authentication, with the result that the positional information of the mobile phone terminal is not directly related to an occurrence position of an incident, and thus it is difficult to use the crime prevention system for the incident occurrence prediction or the like.

In addition, in an example of the related art disclosed in Japanese Patent Unexamined Publication No. 2007-158496, it is possible to display incident information which indicates an occurrence position of an actually occurred incident on the map. However, in the example of the related art disclosed in Japanese Patent Unexamined Publication No. 2007-158496, information of a specific incident is displayed, and thus it is difficult to predict of an occurrence tendency of a subsequent incident using information of the occurrence position.

SUMMARY

In order to solve the above-described problems of the related art, an object of the present disclosure is to provide an information display system and an information display method which are capable of accurately and easily predicting incident occurrence using a plurality of pieces of incident-related information.

The present disclosure provides an information display system to which a server device that collects crime-related information relevant to an incident, and a client device that includes a display for displaying the crime-related information are coupled. The server device accesses an SNS server that accumulates submission information of general citizens, collects submission information, which includes crime-related terms, from the submission information as the crime-related information, and records the submission information in a storage, calculates statistical data for each attribute, which includes a crime occurrence place, an occurrence hour, a crime type of a crime, for the crime-related information, and sends crime data and map data, which are extracted from the statistical data of the crime-related information, to the client device in response to a request from the client device. The client device receives the crime data and the map data which are sent from the server device, superimposes the crime data on the map data for each attribute on the display, and plots and displays the crime data in a position corresponding to the crime occurrence place on a map.

According to the present disclosure, it is possible to accurately and easily predict incident occurrence using a plurality of pieces of incident-related information.

BRIEF DESCRIPTION OF THE DRAWINGS

FIG. 16 is a view illustrating an example of statistical data of crime-related information;

DETAILED DESCRIPTION

Hereinafter, an exemplary embodiment (hereinafter, referred to as "the exemplary embodiment") in which an information display system and an information display method according to the present disclosure is disclosed in detail will be appropriately described in detail with reference to accompanying drawings. However, there is a case where unnecessarily detailed description is omitted. For example, there is a case where detailed description of already well-known information or duplicated description of substantially the same configuration is omitted. The reason for this is to avoid description below from being unnecessarily redundant and to make those skilled in the art easily understand. Meanwhile, the accompanying drawings and description below are provided to make those skilled in the art sufficiently understand the present disclosure, and it is not intended to limit a subject disclosed in claims by the accompanying drawings and description below.

In the exemplary embodiment below, a police work support system will be exemplified, which supports various works, such as management of monitoring videos in each site within a jurisdiction, management of recording videos related to an incident, patrols of police officers, disposition of the police officers and patrol cars, and investigation or analysis of the incident, in a police organization, and a configuration, a function, and a process procedure of the system will be described. However, the exemplary embodiment of a system and a method according to the present disclosure are not limited to content of the exemplary embodiment which will be described later. It is possible to apply the present disclosure to a system related to, for example, various works for crime prevention, such as a monitoring system and a security work support system, in a security company.

Figure 1:
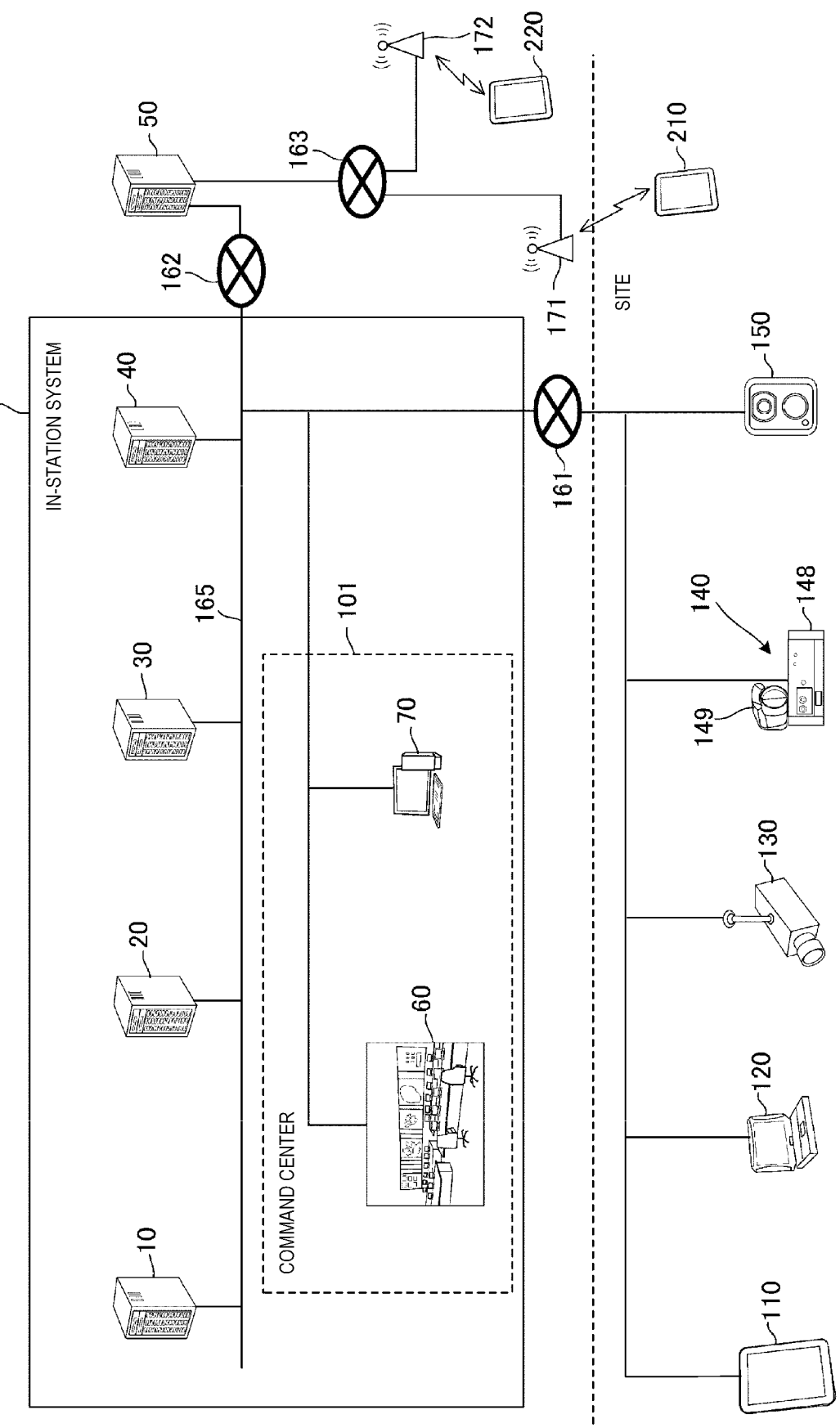
FIG. 1 is a view illustrating an example of a configuration of a police work support system according to an exemplary embodiment.

FIG. 1 is a view illustrating an example of the configuration the police work support system according to an exemplary embodiment. The configuration of the police work support system includes in-station system 100 that is installed in a police station, and at least one of mobile terminal 110, site Personal Computer (PC) 120, monitoring camera 130, in-vehicle camera system (In Car Video (ICV)) system) 140, and wearable camera (Body-Worn Camera (BWC)) 150 as equipment that is disposed in each site in the jurisdiction. Equipment, such as mobile terminal 110, site PC 120, monitoring camera 130, in-vehicle camera system 140, or wearable camera 150, is collectively referred to as a site terminal. The site terminal is coupled to in-station system 100 through network 161 using wireless communication or wired communication, and transmits and receives data.

Mobile terminal 110 or site PC 120 is possessed by a police officer at the site in a case of patrol, and is used to read and input various pieces of information and to receive commands or the like. Mobile terminal 110 includes an information communication terminal such as a tablet terminal or a smart phone. Site PC 120 includes a portable computer, such as a notebook computer, and is used in a state of being mounted on a patrol car. In-vehicle camera system 140 is mounted on the patrol car, includes in-vehicle camera 149 and in-vehicle recorder 148, and records an imaging video in the vicinity of the site, which is imaged by in-vehicle camera 149, in in-vehicle recorder 148. Monitoring camera 130 is installed inside/outside of a building, on the road, or the like of each site within the jurisdiction, images a monitoring target area of each location, and acquires an imaging video. Wearable camera 150 is used by being worn on the clothes of a police officer or possessed by the police officer, and images and records situation around the police officer.

In-station system 100 includes at least one of content management server 10, Police disposition server 20, crime prediction server 30, and device management server 40 as a server device, and includes at least one of center console 60 and client PC 70 as a client device in a command room disposed in a command center 101. Center console 60 includes a large screen display, a computer, and a communication device. Client PC 70 is a computer which is used by a police officer who is a user in the police station. Center console 60 and client PC 70 in command center 101 are collectively referred to as a center device. The center device functions as a client device coupled to the server device, displays various pieces of information collected in the jurisdiction, checks a site situation, monitors the imaging videos, and receives reports, sends commands or the like. Meanwhile, it is possible to cause the site terminal to function as the client device. Each of the servers and the center devices of in-station system 100 is coupled through network 165 using wired communication or wireless communication.

Network 161, which couples in-station system 100 to the site terminal, and network 165 in in-station system 100 is a wireless network or a wired network. The wireless network is, for example, a wireless Local Area Network (LAN), a wireless Wide Area Network (WAN), 3G, Long Term Evolution (LTE), or Wireless Gigabit (WiGig). The wired network is, for example, intranet or the internet.

Content management server 10, Police disposition server 20, crime prediction server 30, and device management server 40 are collectively referred to as the server device. The server device includes, for example, a computer and a storage, and performs various processes as the client device according to an instruction from a center device. Each server device may perform a prescribed function in a server (including a physical server device and a logical virtual server), in which at least one is provided in an external cloud network, instead of the inside of in-station system 100. In addition, functions of the plurality of servers may be realized by one server device. That is, although content management server 10, Police disposition server 20, crime prediction server 30, and device management server 40 are separately described, content management server 10, Police disposition server 20, crime prediction server 30, and device management server 40 may be collectively formed by one or more server devices.

It is possible to couple in-station system 100 to Social Networking Service (SNS) server 50 provided in an external network. In-station system 100 is coupled to SNS server 50 through network 162 which includes a gateway that relays communication with the external network. SNS server 50 is a server device which operates, for example, an SNS such as Twitter (registered trademark), Facebook (registered trademark), or Instagram (registered trademark). SNS server 50 is coupled to mobile terminals 210 and 220, which are used by general citizens through network 163 and access points 171 and 172, and collects and delivers pieces of submission information, which are formed by text and/or images, from the plurality of general citizens. Network 163 is a network, such as the Internet or a mobile communication network, which enables communication in a wide area. Access points 171 and 172 are wireless stations which perform wireless coupling between mobile terminals 210 and 220 that perform wireless communication such as wireless LAN, wireless WAN, 3G, and LTE. Hereinafter, mobile terminals 210 and 220, which are used by the general citizens, are referred to as a citizen terminal.

Mobile terminal 110 and site PC 120 are possessed by the police officer, for example, are used to input pieces of attribute information, such as a name and an address of an investigation target subject who is a suspect of a crime or an accident, a traffic violation, or the like in the site, input of pieces of incident information related to an incident, registers a signature of the investigation target subject, and sends the pieces of input and registered information to in-station system 100. In the exemplary embodiment, matters, such as a crime, an accident, and a traffic violation, which are targets of the police work are generally referred to as incidents, and a person who is a target of a police work, such as a suspect, an arrested person, or a past criminal, are generally referred to as the investigation target subject. In addition, mobile terminal 110 and site PC 120 receive a command of command center 101, display the command on a display or notify the police officer of the command through voice output. In addition, mobile terminal 110 and site PC 120 receive various pieces of information, such as video data of an incident video, map information, and person information, from in-station system 100, and display the received information on the display.

Monitoring camera 130 images a monitoring target area in an installation position, and sends the video data of the imaging video to in-station system 100. In monitoring camera 130, various video imaging forms, such as regular imaging, imaging based on sensor detection or the like when a prescribed matter occurs, and imaging in a prescribed hour or a prescribed time slot, are considered. In addition, with regard to recording, various video recording forms, such as regular recording, recording only when a prescribed matter occurs, and recording only in the prescribed hour or the prescribed time slot, are considered.

Wearable camera 150 images atmosphere in front of the police officer as a subject, and sends imaged video data and collected voice data to in-vehicle camera system 140. Meanwhile, video data of an imaging image may be directly sent from wearable camera 150 to in-station system 100. In-vehicle camera system 140 records video data imaged by in-vehicle camera 149 and video data transmitted from wearable camera 150 as the imaging video in in-vehicle recorder 148. In addition, in-vehicle camera system 140 sends the video data of the imaging video to in-station system 100. A subject which is an imaging target of wearable camera 150 or in-vehicle camera 149 includes not only a person but also a scene of an incident site, a crowd (so called spectators) who clusters near the site, and further atmosphere around the imaging position.

In in-station system 100, content management server 10 inputs the video data of the imaging video acquired from site terminals, such as monitoring camera 130, in-vehicle camera system 140, and wearable camera 150, associates the imaging video with the incident information, and records the associated video as the incident video. In addition, content management server 10 accumulates, extracts, searches for, and delivers the video data of the incident video. Meanwhile, content management server 10 may record various pieces of attribute information related to an incident, such as person information and vehicle information, for collating investigation target subject of an incident.

Police disposition server 20 instructs to dispose police officers, prepares a disposition plan, and supports disposition work such as dispatch of a police officer as an example of a dispatched worker to an incident occurrence location and scheduling of patrols. Police disposition server 20 registers attribute information of a police officer, attribute information of a patrol car, and map information within the jurisdiction, acquires positional information of the police officer and the patrol car, and performs a process of disposing the police officer.

Crime prediction server 30 uses a plurality of pieces of submission information accumulated in SNS server 50, collects crime-related information which is regarded as being related to crime, and generates prediction data related to crime occurrence and statistical information. Here, crime prediction server 30 associates crime-related information with positional information and time information, and constructs a database of crime occurrence information that includes a crime type, the positional information, and the time information in which crime occurs. Crime prediction server 30 includes map information within the jurisdiction, calculates a position and a time slot on the map, in which crime frequently occurs, as crime occurrence prediction data, and generates statistical information in which the prediction data is aggregated.

Device management server 40 manages equipment, such as mobile terminal 110, site PC 120, monitoring camera 130, in-vehicle camera system 140, or wearable camera 150, which is used as the site terminal. Device management server 40 maintains a terminal ID of each site terminal, a police officer ID, and a vehicle ID of a patrol car, collates the police officer with the patrol car, and site terminal, and registers and updates a use state of each site terminal. In addition, device management server 40 acquires positional information of each site terminal, and updates the positional information in a case where the site terminal is moved. Meanwhile, the positional information of the site terminal may be maintained in each site terminal, may be notified to device management server 40 or another device if necessary, and the positional information of each site terminal may be managed at device management server 40.

Figure 2:
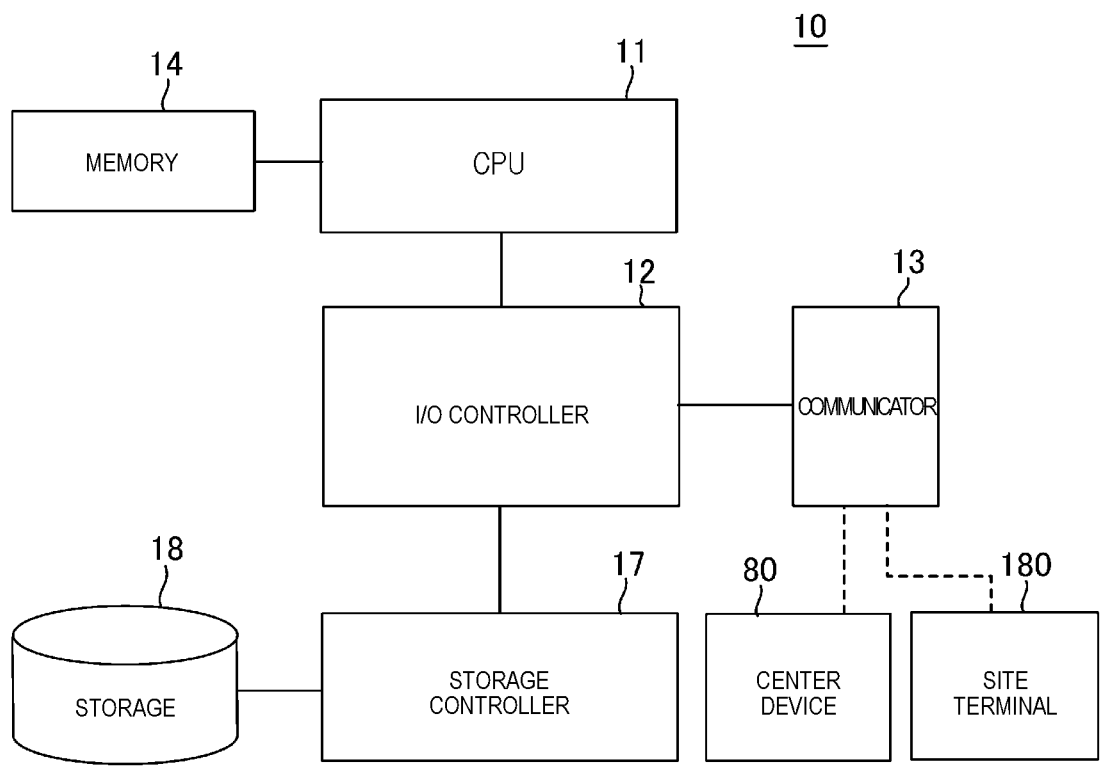
FIG. 2 is a block diagram illustrating an example of a hardware configuration of a server device according to the exemplary embodiment.

FIG. 2 is a block diagram illustrating an example a hardware configuration of a server device according to the exemplary embodiment. Here, although an example of a configuration of content management server 10 will be described, a primary configuration is the same as in other Police disposition server 20, crime prediction server 30, device management server 40, and SNS server 50. Hereinafter, content management server 10, Police disposition server 20, crime prediction server 30, device management server 40, and SNS server 50 are collectively referred to as a server device. Content management server 10 as an example of a server device includes CPU 11, I/O controller 12, communicator 13, memory 14, storage controller 17, and storage 18.

CPU 11 performs, for example, a control process of generalizing overall operations of respective units of content management server 10, a data input/output process between other respective units, a data operation (calculation) process, and a data storage process. CPU 11 operates according to a program and data stored in memory 14.

I/O controller 12 performs data input/output-relevant control between CPU 11 and the respective units (for example, communicator 13 and storage controller 17) of content management server 10, and performs relay of data from CPU 11 and data into CPU 11. Meanwhile, I/O controller 12 may be integrally formed with CPU 11.

Communicator 13 performs wired or wireless communication between site terminals 180, such as mobile terminal 110, site PC 120, monitoring camera 130, in-vehicle camera system 140, and wearable camera 150, or between center devices 80 such as center console 60 and client PC 70.

Memory 14 is formed using, for example, a RAM, a ROM, or a nonvolatile or volatile semiconductor memory, functions as a work memory when CPU 11 operates, and preserves a prescribed program and data for operating CPU 11.

In a case where CPU 11 requests site terminal 180 to send the imaged video data, storage controller 17 controls a video recording operation of inputting and writing the video data received in response to the request to storage 18. In addition, in a case where CPU 11 receives a request to deliver the video data of the imaging video from center device 80, storage controller 17 controls video output operation of reading and outputting video data from storage 18 according to the request. Storage 18 is a storage device, such as an SSD or an HDD, which is controlled by storage controller 17, and accumulates the video data of the imaging video which is input through I/O controller 12 according to an instruction from CPU 11.

Figure 3:
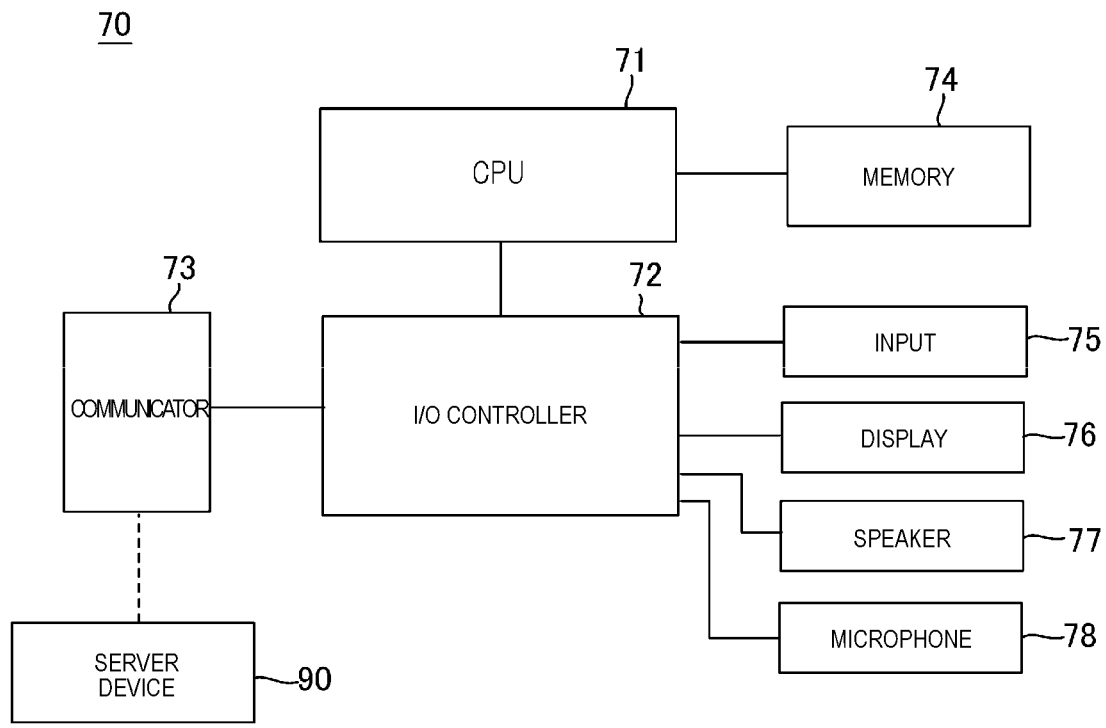
FIG. 3 is a block diagram illustrating an example of a hardware configuration of a center device according to the exemplary embodiment.

FIG. 3 is a block diagram illustrating an example of a hardware configuration of the center device according to the exemplary embodiment. Here, although an example of a configuration of client PC 70 will be described, a primary configuration is the same as in another center console 60. Client PC 70 as an example of the center device includes CPU 71, I/O controller 72, communicator 73, memory 74, input 75, display 76, speaker 77, and microphone 78.

CPU 71 performs, for example, a control process of generalizing overall operations of respective units of client PC 70, a data input/output process between other respective units, a data operation (calculation) process, and a data storage process. CPU 71 operates according to a program and data stored in memory 74.

I/O controller 72 performs data input/output-relevant control between CPU 71 and the respective units (for example, communicator 73, input 75, and display 76) of client PC 70, and performs relay of data from CPU 71 and data into CPU 71. Meanwhile, I/O controller 72 may be integrally formed with CPU 71.

Communicator 73 performs wired communication between server devices 90, such as content management server 10, Police disposition server 20, crime prediction server 30, and device management server 40. In addition, communicator 73 may perform wired or wireless communication between site terminals 180 such as mobile terminal 110, site PC 120, monitoring camera 130, in-vehicle camera system 140, and wearable camera 150.

Memory 74 is formed using, for example, a RAM, a ROM, or a nonvolatile or volatile semiconductor memory, functions as a work memory when CPU 71 operates, and preserves a prescribed program and data for operating CPU 71.

Input 75 is a User Interface (UI) that receives an input manipulation of a police officer or a person in charge in the command center 101 or a police officer or a person in charge in a police station and that notifies the received input manipulation to CPU 71 through I/O controller 72, and is a, for example, an input device such as a mouse and a keyboard. Input 75 may be disposed to correspond to, for example, a screen of display 76, and may be formed using a touch panel or a touch pad which can be operated by a finger of the police officer or the person in charge or a stylus pen.

Display 76 is formed using, for example, a Liquid Crystal Display (LCD) or an organic Electroluminescence (EL), and displays various pieces of information. For example, in a case where incident information display is instructed through input manipulation of a police officer or a person in charge, display 76 displays designated incident-relevant incident information under an instruction of CPU 71. In addition, for example, in a case where incident video display is instructed through the input manipulation of the police officer or the person in charge, display 76 displays incident video corresponding to the incident information under the instruction of CPU 71. In addition, for example, in a case where police disposition is instructed through the input manipulation of the police officer or the person in charge, display 76 displays disposition support information related to police officer disposition under the instruction of CPU 71.

Speaker 77 outputs various types of voice. For example, in a case where incident video display is instructed through the input manipulation of the police officer or the person in charge, speaker 77 reproduces and outputs voice data of the incident video under the instruction of CPU 71. In addition, in a case where a report is received from each site or site terminal 180 within the jurisdiction, the voice data which is received from CPU 71 through I/O controller 72 is input and voice of a reporter is output.

Microphone 78 inputs voice which is produced by the police officer or the person in charge in the command center 101 or the police officer or the person in charge in the police station. For example, in a case where the police officer or the person in charge gives a command using voice, microphone 78 collects and inputs voice of the police officer or the person in charge, and outputs voice data to CPU 71 through I/O controller 72. CPU 71 sends the input voice data to site terminal or another center device using communicator 73.

Figure 4:
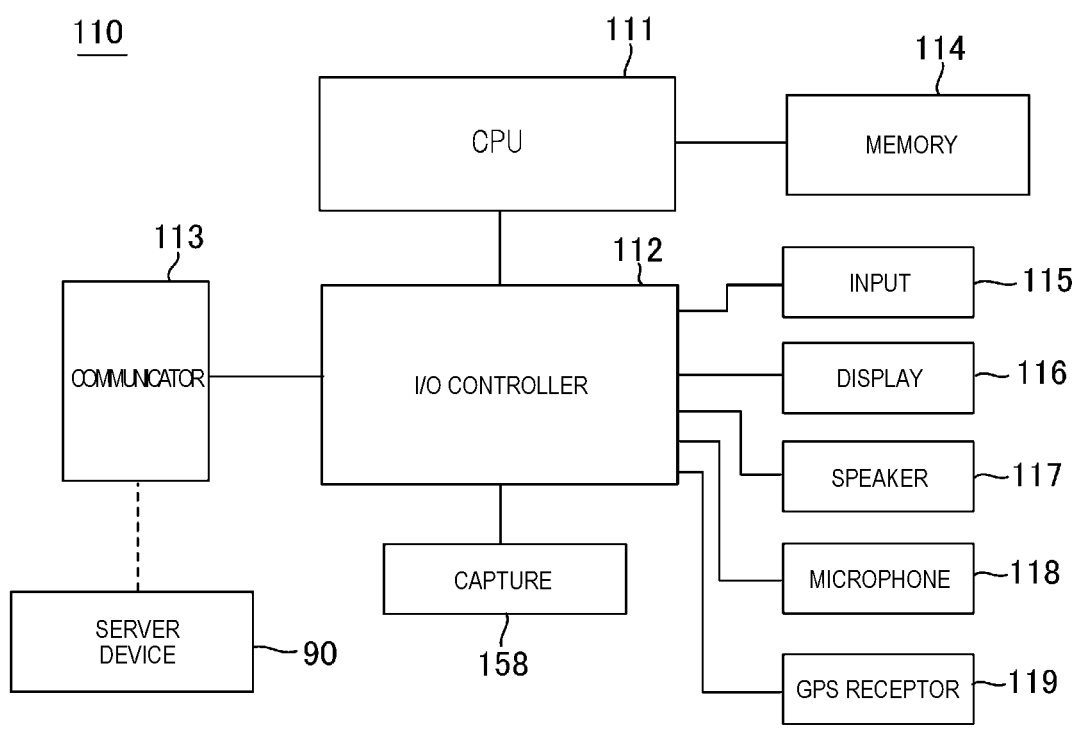
FIG. 4 is a block diagram illustrating an example of a hardware configuration of a site terminal according to the exemplary embodiment.

FIG. 4 is a block diagram illustrating an example of a hardware configuration of the site terminal according to the exemplary embodiment. Here, although an example of a configuration of mobile terminal 110 will be described, a primary configuration is the same as in other site PC 120 and in-vehicle camera system 140. In addition, since monitoring camera 130 and wearable camera 150 include at least a capture and a communicator, a primary configuration is the same. Mobile terminal 110 as an example of the site terminal includes CPU 111, I/O controller 112, communicator 113, memory 114, input 115, display 116, speaker 117, microphone 118, capture 158, and Global Positioning System (GPS) receptor 119.

CPU 111 performs, for example, a control process of generalizing overall operations of respective units of mobile terminal 110, a data input/output process between other respective units, a data operation (calculation) process, and a data storage process. CPU 111 operates according to a program and data stored in memory 114.

I/O controller 112 performs data input/output-relevant control between CPU 111 and the respective units (for example, communicator 113, input 115, display 116, and capture 158) of mobile terminal 110, and performs relay of data from CPU 111 and data into CPU 111. Meanwhile, I/O controller 112 may be integrally formed with CPU 111.

Communicator 113 performs wireless or wired communication between server devices 90, such as content management server 10, Police disposition server 20, crime prediction server 30, and device management server 40. In addition, communicator 113 may perform wired or wireless communication between center devices 80 such as center console 60 and client PC 70.

Memory 114 is formed using, for example, a RAM, a ROM, or a nonvolatile or volatile semiconductor memory, functions as a work memory when CPU 111 operates, and preserves a prescribed program and data for operating CPU 111.

Input 115 is a UI that receives an input manipulation of a police officer or a person in charge in the site and notifies the received input manipulation to CPU 111 through I/O controller 112, and is an input device, such as a touch panel or a touch pad, which is disposed to correspond to, for example, a screen of display 116, and can be operated by a finger of the police officer or the person in charge or a stylus pen. Meanwhile, in a case where the site terminal is site PC 120, in-vehicle recorder 148, wearable camera 150, or the like, input 115 may use an input device such as a pressing button, a switch, or a keyboard.

Display 116 is formed using, for example, an LCD or an organic EL, and displays various pieces of information. For example, in a case where incident information display is instructed through input manipulation of a police officer, display 116 displays specific incident-relevant incident information under an instruction of CPU 111. In addition, for example, in a case where incident video display is instructed through the input manipulation of the police officer, display 116 displays incident video corresponding to the incident information under the instruction of CPU 111. In addition, for example, in a case where a command, a notification, or the like is received from center device 80 or server device 90, display 116 displays reception information, such as the command and the notification, under the instruction of CPU 111.

Speaker 117 outputs various types of voice. For example, in a case where incident video display is instructed through the input manipulation of the police officer, speaker 117 reproduces and outputs voice data of the incident video under the instruction of CPU 111. In addition, in a case where a command, a notification, or the like is received from center device 80 through voice, voice data received from CPU 111 through I/O controller 112 is input, and voice, such as the command or the notification, is output. In addition, in a case where communication is performed with a site terminal of another police officer or another person in charge or the center device, voice data of receiving voice is input from CPU 111 through I/O controller 112, and the receiving voice is output.

Microphone 118 inputs voice, which is produced by the police officer or the person in charge in the site, or sounds of atmosphere around the site. For example, in a case where the police officer or the person in charge performs a report to command center 101 or performs communication with a terminal of another police officer or another person in charge using voice, microphone 118 collects and inputs voice of the police officer or the person in charge, and outputs voice data to CPU 111 through I/O controller 112. In addition, in a case where moving images are imaged by capture 158, microphone 118 collects and inputs peripheral sounds, and outputs the voice data to CPU 111 through I/O controller 112. CPU 111 sends the input voice data to the center device, the server, or another site terminal using communicator 113.

Capture 158 includes an imaging lens and a solid-state imaging device formed of a Charge Coupled Device (CCD)-type image sensor or a Complementary Metal Oxide Semiconductor (CMOS)-type image sensor. Capture 158 images a subject of a site, and outputs acquired image data of the subject to CPU 111 through I/O controller 112. For example, in a case where atmosphere around a police officer in a site is imaged by mobile terminal 110 or wearable camera 150 or in a case where a prescribed monitoring area of the site is imaged by monitoring camera 130, capture 158 acquires video data of the imaged moving images or still images and outputs the video data to CPU 111. CPU 111 sends the input video data to the center device, the server device, or another site terminal using communicator 113.

GPS receptor 119 receives satellite signals, which are sent from a plurality of GPS transmitters (for example, four navigation satellites) and include respective signal sending hours and position coordinates, and outputs the received satellite signals to CPU 111 through I/O controller 112. CPU 111 calculates current positional coordinates of mobile terminal 110, wearable camera 150, or in-vehicle camera system 140 and reception hours of the satellite signals using the plurality of satellite signals. Meanwhile, the calculation may be performed by GPS receptor 119 instead of CPU 111. CPU 111 sends the acquired positional information of the site terminal, such as mobile terminal 110, to the center device, the server device, or another site terminal using communicator 113. Meanwhile, information of the reception hour of the satellite signal may be used to correct a system hour of the site terminal. The system hour is used for recording or the like of imaging hour of the imaged images (including still images and moving images).

First Exemplary Embodiment

An incident video display process of the police work support system will be described as a first exemplary embodiment. A system which performs the incident video display process according to the exemplary embodiment may be formed as a monitoring system. In addition, it is possible to prescribe a process procedure of the monitoring system as a monitoring method. The first exemplary embodiment illustrates a process procedure of displaying a plurality of incident videos.

Figure 5:
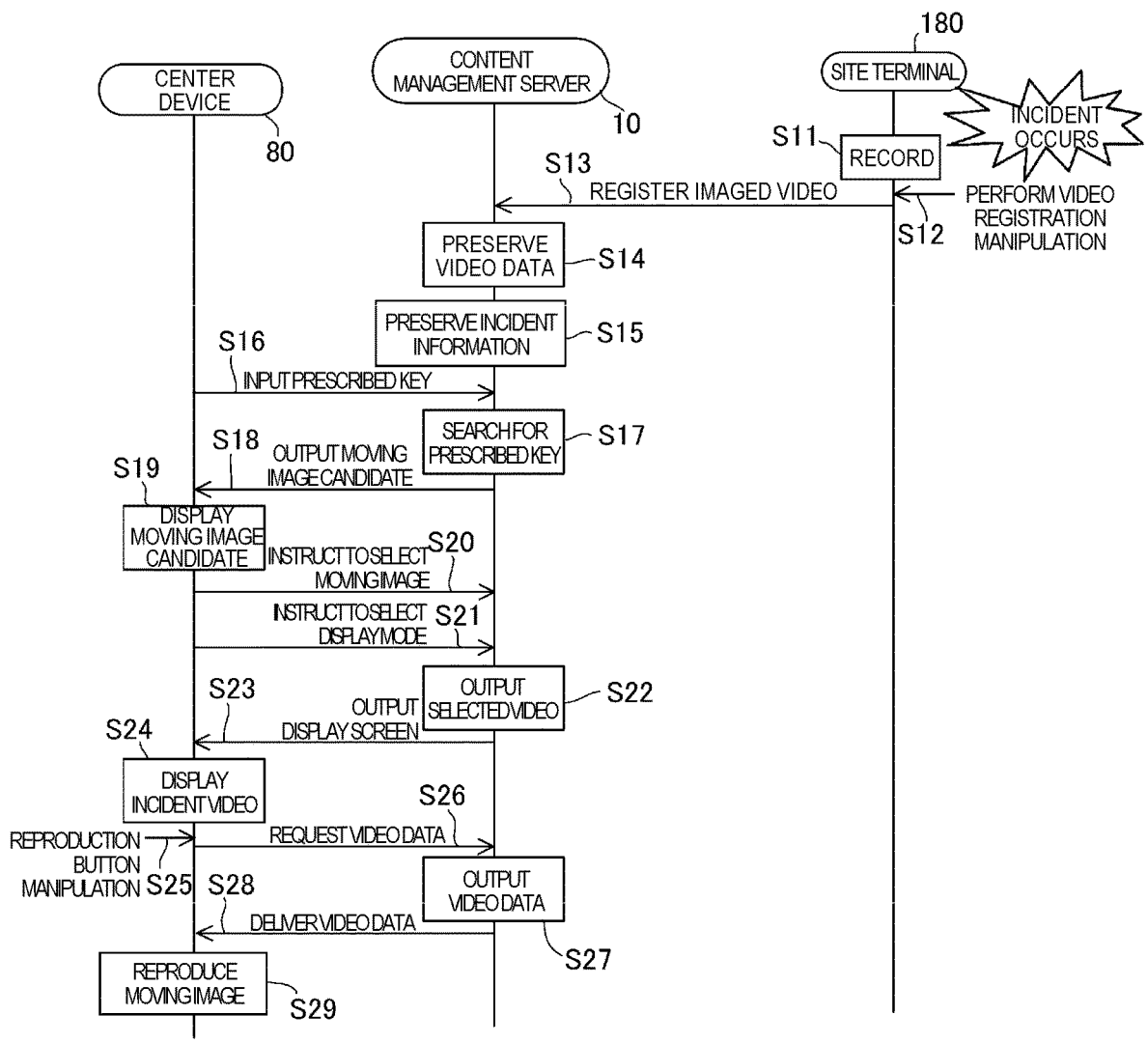
FIG. 5 is a sequence view illustrating an example of an operation procedure of an incident video display process according to a first exemplary embodiment.

FIG. 5 is a sequence view illustrating an example of an operation procedure of the incident video display process according to the first exemplary embodiment. In the exemplary embodiment, a procedure is illustrated in a case of accumulating incident videos, which are relevant to an incident occurred within police jurisdiction and are imaged by site terminal 180, such as monitoring camera 130, wearable camera 150, mobile terminal 110, or in-vehicle camera system 140, in content management server 10, and displaying the incident videos on center device 80 such as client PC 70.

In FIG. 5, in a case where an incident occurs, site terminal 180 images subjects around the site, and records imaged video data (S11). Furthermore, in a case where a police officer or the like, who is a user, performs a video registration manipulation (S12), site terminal 180 sends the video data of an imaging video to content management server 10 through network 161, and registers the imaging video (S13). The video registration manipulation performed by the user is manipulation input of ending recording in a case where imaging is performed by wearable camera 150, and the video registration manipulation performed by the user is manipulations input of ending recording, sending the recorded video, and the like in a case where imaging is performed by mobile terminal 110 or in-vehicle camera system 140. In addition, in a case where imaging is performed by monitoring camera 130, the video registration manipulation is manipulation input, such as downloading of the recorded video using center console 60 or client PC 70 performed by the user of command center 101. Meanwhile, it is possible to register the imaging video in content management server 10 by coupling site terminal 180 to network 165 in the police station through a Universal Serial Bus (USB).

In a case where content management server 10 receives video data to be registered from site terminal 180, content management server 10 preserves the video data of the imaging video in storage 18 (S14). Furthermore, content management server 10 preserves incident information related to the imaging video (S15). The incident information includes, for example, a name of a person who is related to an incident, an incident occurrence place, time, an incident management number, an incident type, and the like. Content management server 10 constructs an incident video database by associating the video data of the imaging video with the incident information and preserving the resulting video data as an incident video in storage 18.

Center device 80 is capable of displaying an incident video display screen, which realizes an incident video display interface, on display 76 and displaying the incident video according to a user manipulation. Center device 80 inputs prescribed key information, which is used to extract the incident video, to content management server 10 based on input of a search word performed by a police officer or a person in charge, who is the user, in the command center 101 or input of information corresponding to a specific incident from the site terminal or the in-police station terminal (S16). In a case where content management server 10 receives the key information from center device 80, content management server 10 performs a process of searching for the incident video preserved in storage 18, and extracts an incident video corresponding to the prescribed key information as a moving image candidate (S17). That is, content management server 10 extracts a relevant incident video using the key information as a common item. Furthermore, content management server 10 outputs video attribute information of the extracted moving image candidate to center device 80 (S18). In a case where center device 80 receives the video attribute information of the moving image candidate, center device 80 displays the moving image candidate of the incident video on display 76 (S19). Subsequently, based on moving image candidate selection manipulation and display mode selection manipulation performed by the user, center device 80 sends moving image selection instruction (S20) of the incident video and display mode selection instruction (S21) to content management server 10. In a case where content management server 10 receives the moving image selection instruction and the display mode selection instruction from center device 80, content management server 10 outputs the video data of the selected incident video and incident information (S22), and outputs a display screen corresponding to the selected display mode to center device 80 (S23). Center device 80 displays the incident video display screen, which is output from content management server 10, on display 76 (S24).

Figure 6:
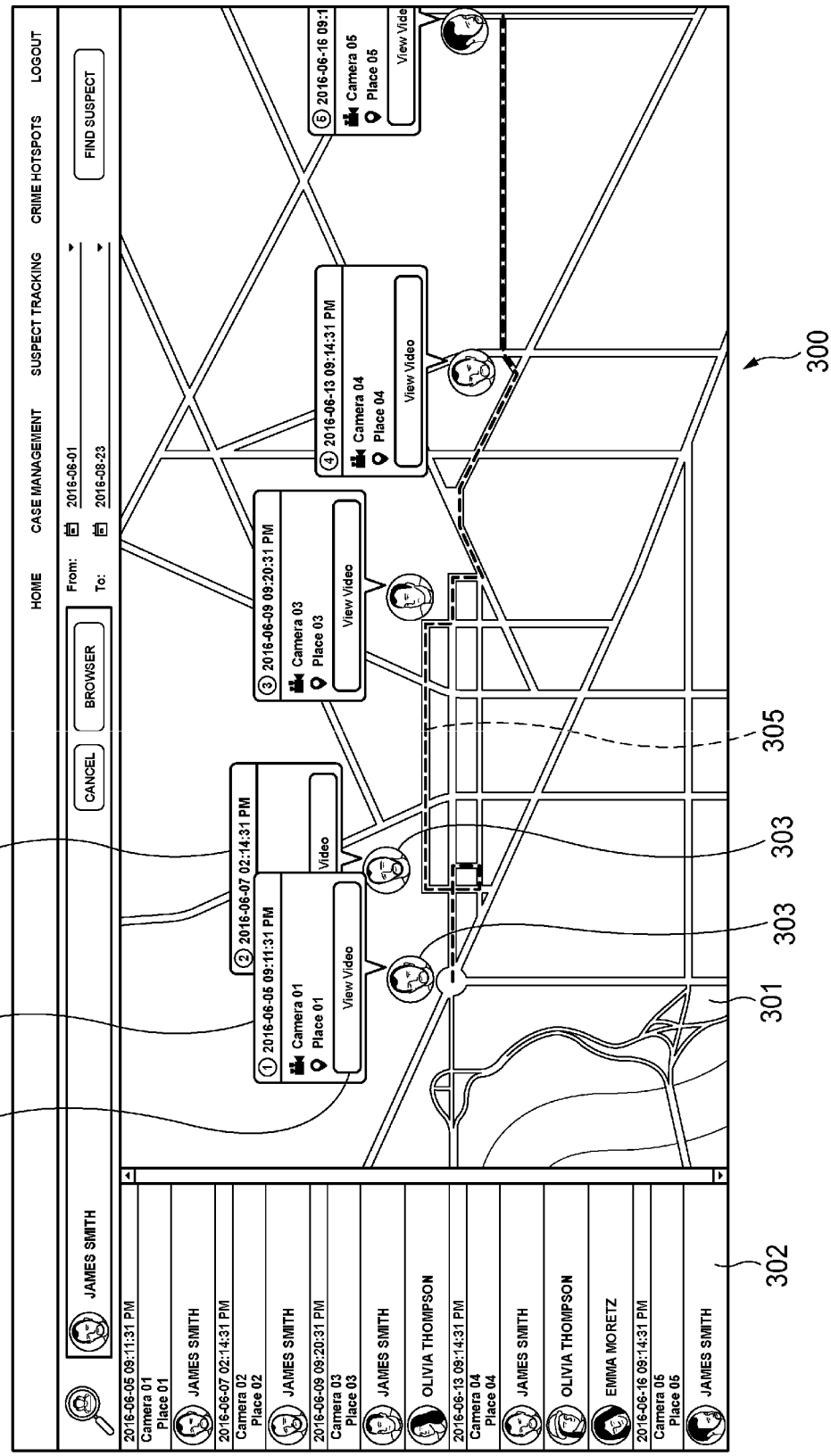
FIG. 6 is a view illustrating a first example of an incident video display screen.

FIG. 6 is a view illustrating a first example of the incident video display screen. The first example is an example of a display mode which enables a plurality of incident videos to be arranged and displayed on a map of a prescribed region within the jurisdiction according to a result of search for key information of a person.

Incident video display screen 300 of the first example includes map information 301 and video-related information 302 disposed on a left end portion of the screen. On the map of map information 301, it is illustrated that a plurality of incident videos are recorded. Video mark 303 which indicates an imaging place and video attribute information 304, which includes an imaging date and an imaging hour, an imaging camera (Camera 01 or the like), and a location (Place 1 or the like) of the imaging place, are displayed for each of the incident videos. In a lower part of video attribute information 304, video reproduction button (View Video) 306, which instructs to perform reproduction display of the incident video, is provided. In video mark 303, a facial image of the investigation target subject, which is included in the incident video, is displayed as a thumbnail image. The investigation target subject corresponds to a person who is extracted as a result of search for the person according to designation of the key information of the person by the user. The example of the drawing illustrates a case in which "JAMES SMITH" is searched as an example of the key information of the person and the video attribute information of the incident video, in which the person is imaged, is arranged and displayed on the map. In addition, in a case where there is path information of movement locus of the investigation target subject as the incident information based on the positional information of the site terminal acquired when the police officer possesses mobile terminal 110 or wearable camera 150 and chases the investigation target subject, center device 80 is capable of acquiring the path information of the movement locus and displaying movement locus 305 on the map of map information 301.

In video-related information 302, the imaging date and the imaging hour, the imaging camera (Camera 01 or the like), the location (Place 1 or the like) of the imaging place, and the name and the facial image of the person who is being imaged are displayed as a list for each incident video. In a case where a plurality of people are imaged in one incident video, one or more names and facial images of a representative person are displayed.

In FIG. 5, in a case where reproduction button manipulation is performed for a video reproduction instruction in such a way that the user selects a specific video from the plurality of incident videos and performs pressing manipulation on video reproduction button 306 (S25), center device 80 sends a video data request to content management server 10 (S26). In a case where content management server 10 receives the video data request, content management server 10 reads the video data of the selected incident video from storage 18 and outputs the video data (S27), and delivers the video data to center device 80 (S28). Center device 80 reproduces and displays the delivered video data, thereby performing reproduction of the moving images of the incident video selected by the user (S29).

As described above, in a case where a person corresponding to the investigation target subject is searched for as the key information, it is possible to extract common incident videos related to a specific person and comprehensively display the extracted incident videos on the map, and to reproduce and display an incident video selected by the user. Therefore, it is possible to collect and display incident videos of highly-relevant different sources and to check a relationship between the plurality of incident videos, and the user can effectively and accurately grasp a situation of an incident.

Figure 7:
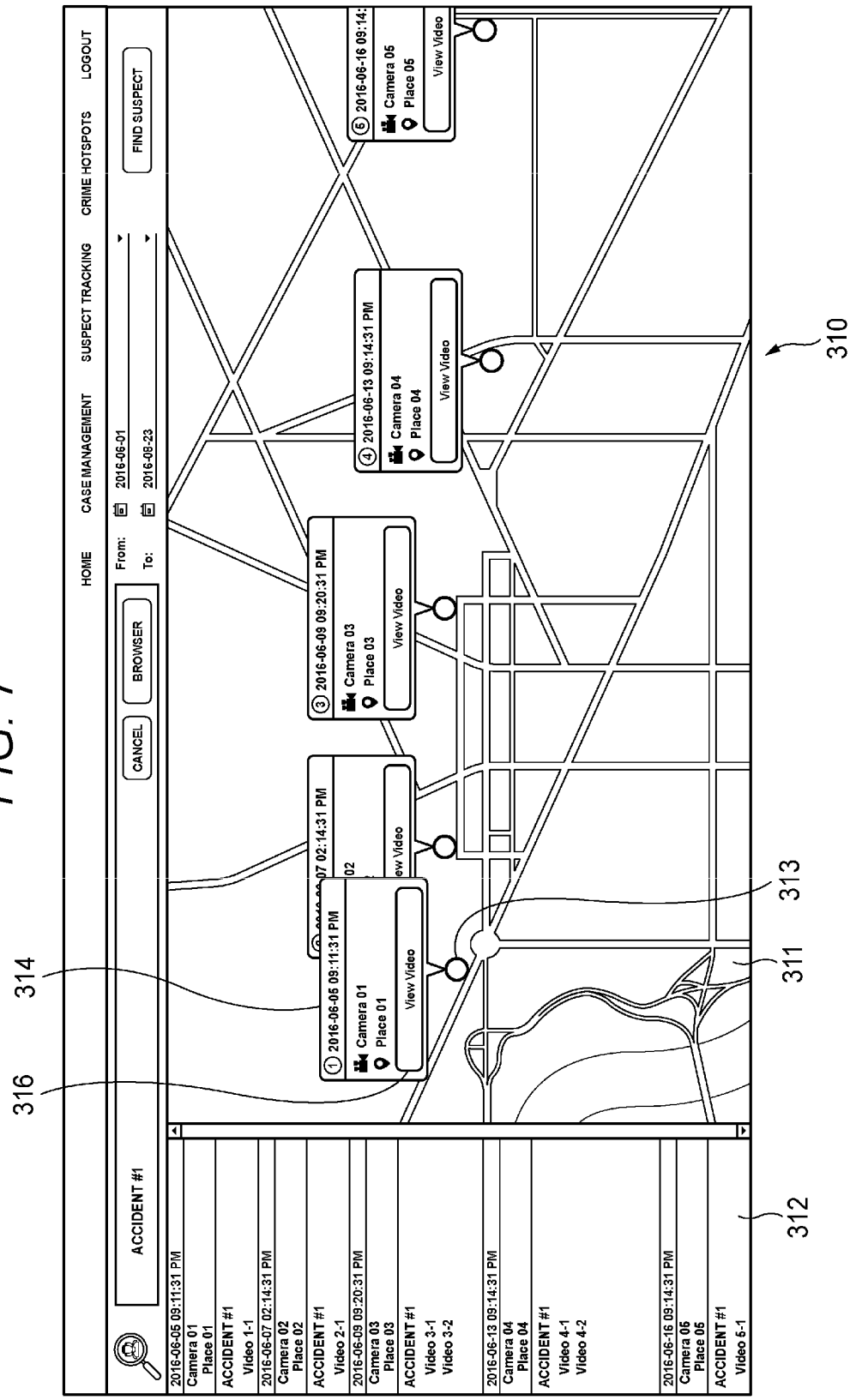
FIG. 7 is a view illustrating a second example of the incident video display screen.

FIG. 7 is a view illustrating a second example of the incident video display screen. The second example is an example of a display mode which enables a plurality of incident videos to be arranged and displayed on a map of a prescribed region within the jurisdiction according to a result of search for key information of an incident. Here, difference from the first example illustrated in FIG. 6 will be mainly described.

Similarly to the first example, incident video display screen 310 of the second example includes map information 311 and video-related information 312 disposed on a left end portion of the screen. On the map of map information 311, video mark 313 which indicates an imaging place, video attribute information (an imaging date and an imaging hour, the imaging camera, a location of the imaging place, or the like) 314, and video reproduction button 316 are displayed for each of the plurality of incident videos. In video-related information 312, an imaging date and an imaging hour, an imaging camera (Camera 01 or the like), a location (Place 1 or the like) of an imaging place, an incident number (ACCIDENT #1 or the like), and a video number (Video 1-1 or the like) are displayed for each incident video as a list. Meanwhile, a representative image of each incident video may be displayed as a thumbnail image. In addition, the plurality of incident videos, which are displayed in the respective imaging places, may be simultaneously operated and reproduced by manipulating video reproduction button 316. The example of the drawing illustrates a case in which "ACCIDENT #1" is searched for as an example of the key information of the incident number and video attribute information of an incident video, in which the incident is imaged, is arranged and displayed on the map.

As described above, even in a case where searching is performed using an incident number of an investigation target as the key information, it is possible to extract common incident videos related to a specific incident and comprehensively display the extracted incident videos on the map, and to reproduce and display an incident video selected by the user, similarly to the case of a person. Therefore, it is possible to collect and display incident videos of highly-relevant different sources and to check a relationship between the plurality of incident videos, and thus the user can effectively and accurately grasp a situation of the incident.

Figure 8:
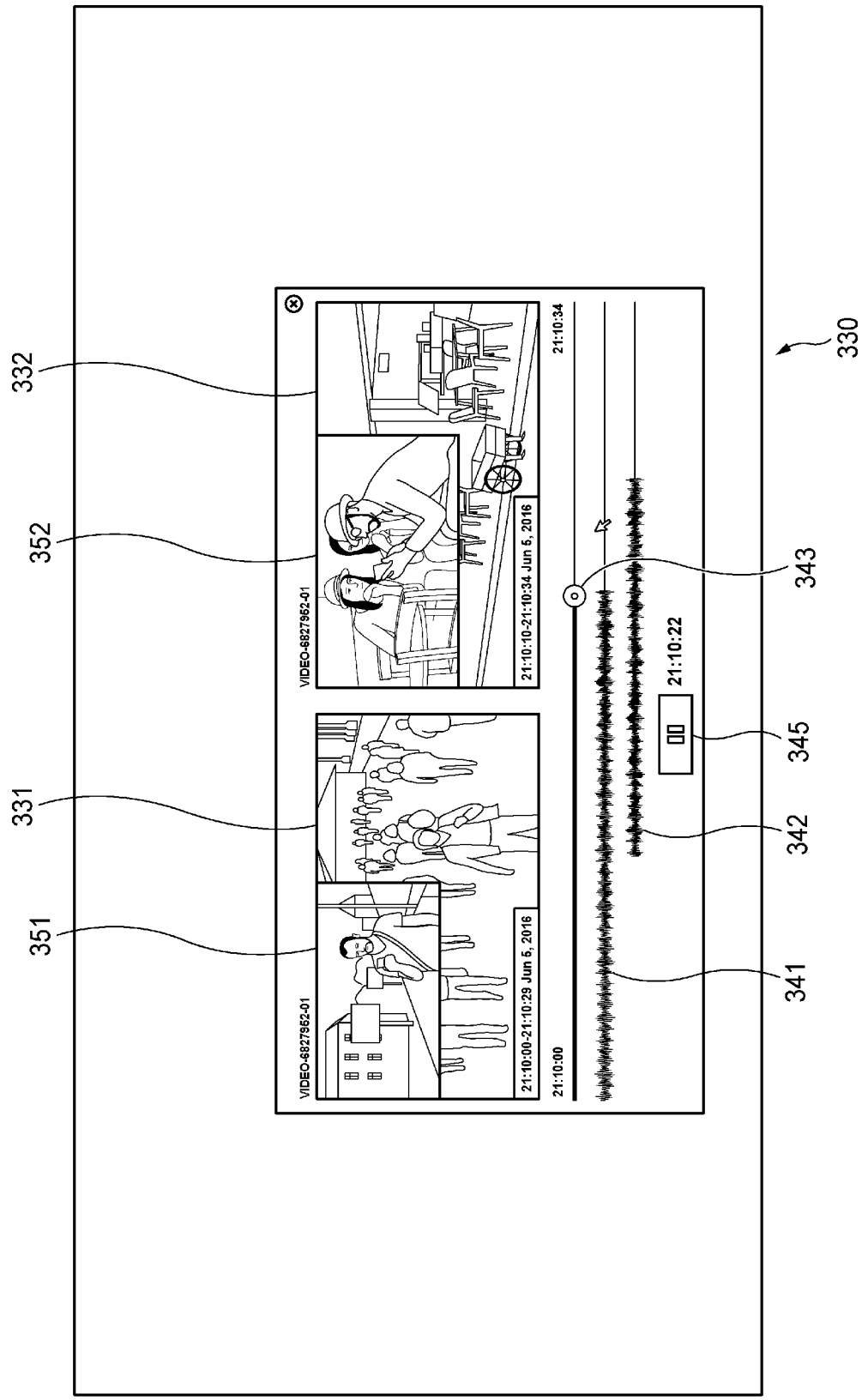
FIG. 8 is a view illustrating a third example of the incident video display screen.

FIG. 8 is a view illustrating a third example of the incident video display screen. The third example is an example of a display mode which enables a plurality of incident videos to be arranged and simultaneously displayed and enables moving images in the same hour to be synchronized and reproduced.

In incident video display screen 330 of the third example, first incident video 331 and second incident video 332 are arranged and displayed while being disposed in sequence. Here, an example is illustrated in which two videos are simultaneously displayed. First incident video 331 and second incident video 332 are videos which are related to the same incident, person, or the like corresponding to the prescribed key information, and videos which have different angles (angle of views and directions) acquired by imaging, for example, the same location (the same place) using cameras (input sources) in different imaging positions. It is possible to check a situation of a site in more detail by arranging and simultaneously displaying videos which are acquired by imaging a scene at the same place in the same hour from different angles. The plurality of incident videos which are simultaneously displayed are displayed by extracting videos from separate angles of the same place, videos in the same hour of different places, or the like.

In first incident video 331 and second incident video 332, sub-screen displays are respectively provided, and thus it is possible to display enlarged display videos 351 and 352 acquired by enlarging parts in the videos. In a case where, for example, the user designates a specific person in incident videos 331 and 332 which are simultaneously displayed, a video corresponding to a part which includes the designated person is enlarged and displayed as the enlarged display videos 351 and 352. Meanwhile, it is possible to designate a plurality of people and enlarge and display the designated people. In lower parts of first incident video 331 and second incident video 332, time display bars 341 and 342, which indicate recording time (a recording start hour and a recording end hour) of the respective incident videos 331 and 332, and reproduction indicator 343 which indicates a current reproduction position (reproduction time), are displayed. In addition, a video reproduction button 345, which is used to instruct reproduction start, temporary stop, and reproduction end of the incident video, is provided. In the example of the drawing, an example is illustrated in which moving images in the same hour, in which a time slot common to the recording time exist, are synchronized and reproduced in the plurality of incident videos which are simultaneously displayed.

As described above, it is possible for the user to easily and accurately grasp a situation of an incident by collecting and displaying incident videos of highly-relevant different sources. In particular, it is possible to check a situation of an incident site in more detail by arranging and, synchronizing, and displaying a plurality of incident videos of different sources related to a common incident or a person, and thus it is possible to effectively investigate a cause of the incident. Therefore, it is possible to improve accuracy of inspection or investigation of the incident.

In the exemplary embodiment, with respect to the plurality of incident videos, which are extracted to correspond to the prescribed key information, video attribute information related to the incident video is superimposed on the map information based on the positional information of the imaging place, the video attribute information is displayed in the imaging place on the map of the map information, and the correspondent incident videos are reproduced and displayed. Therefore, the incident videos of highly-related different sources are collectively and visually recognized, and thus it is possible to recognize the relationship between the plurality of incident videos and it is possible for the user to effectively and accurately grasp the situation of the incident.

In addition, in the exemplary embodiment, the plurality of pieces of video attribute information are arranged and displayed on the map. Therefore, it is possible to effectively compare and check the plurality of highly-related incident videos through contrast.

In addition, in the exemplary embodiment, the movement locus of the person corresponding to the prescribed key information is displayed on the map of the incident video display screen, and thus it is possible to effectively check a relationship between an action history of the investigation target subject which is highly relevant to the incident and the incident video.

In addition, in the exemplary embodiment, the thumbnail image related to the incident video is displayed on the map as the video attribute information to be displayed in the incident video display screen, and thus it is possible to recognize features of a person imaged in the incident video or an outline of the incident video at a glance.

In addition, in the exemplary embodiment, the plurality of incident videos, acquired by different input sources which image the same location, are simultaneously displayed and the incident videos are synchronized, reproduced, and displayed. Therefore, it is possible to check a situation of an incident site in more detail and it is possible for the user to effectively investigate a cause of the incident.

In addition, in the exemplary embodiment, in a case where the incident video is displayed, an enlarged display video, which is acquired by enlarging a part of the incident video, is displayed. Therefore, it is possible to visually recognize a specific person or a part, which attracts attention of the user, in detail.

Second Exemplary Embodiment

A police officer disposition support process of the police work support system will be described as a second exemplary embodiment. A system which performs the police officer disposition support process according to the exemplary embodiment may be formed as a guidance system. In addition, it is possible to prescribe a process procedure in the disposition work support system as a guidance method. In the second exemplary embodiment, a process procedure of supporting dispatch of a police officer in a case where an incident occurs is illustrated.

Figure 9:
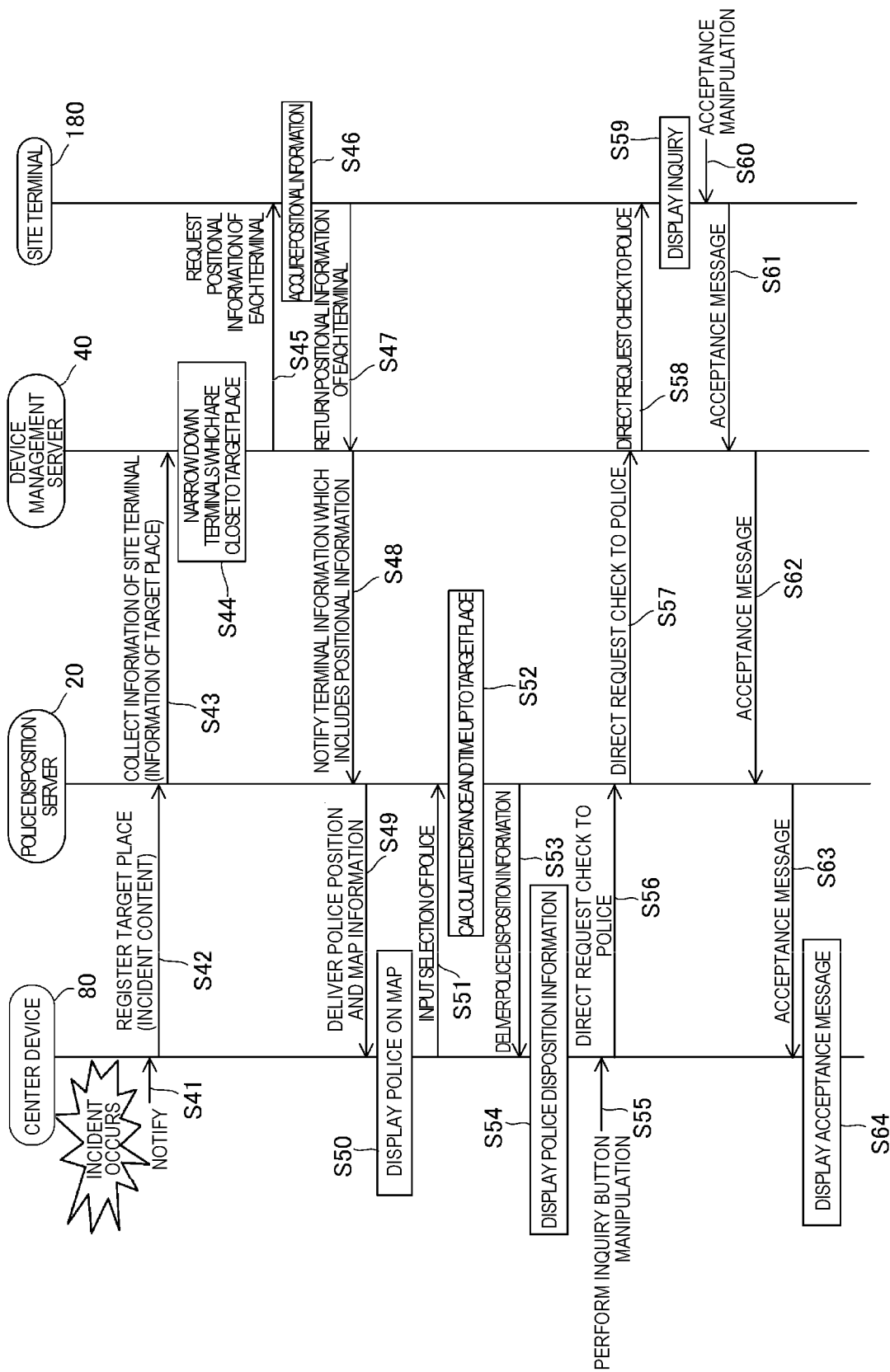
FIG. 9 is a sequence view illustrating an example of an operation procedure of a police officer disposition support process according to a second exemplary embodiment.

FIG. 9 is a sequence view illustrating an example of an operation procedure of a police officer disposition support process according to the second exemplary embodiment. The exemplary embodiment illustrates a procedure of sending an instruction from center device 80, such as client PC 70, to site terminal 180, such as mobile terminal 110 using Police disposition server 20 and device management server 40 in a case where an incident occurs within the police jurisdiction, and supporting disposition of a police officer who becomes a dispatched person.

In FIG. 9, in a case where an incident occurs and notifications of the incident, such as reports or testimonies from a citizen who is a witness or reports from a police officer, are received in command center 101 (S41), center device 80 sends positional information of an incident occurrence location to Police disposition server 20, and registers a target place of police disposition to Police disposition server 20 based on a position of an incident occurrence location (S42). Here, center device 80 displays a police disposition screen, which includes map information within the jurisdiction, on display 76. The police officer or the person in charge in the command center 101, who is a user of center device 80, sets the target place by referring to a police disposition screen displayed on display 76 and designating an incident occurrence location on the map. It is possible to input positional information of the target place by acquiring from witness information using a Record Management System (RMS) provided in, for example, the in-station system based on notification content of the incident, by acquiring through voice recognition of report content, or by performing manual input of the user of center device 80. A location name or an address of the target place is displayed in the police disposition screen. Police disposition server 20 registers the target place, and records incident information related to incident content, such as an incident type and a degree of danger, together. Furthermore, Police disposition server 20 sends information of the target place to device management server 40, inquires about terminal information of the site terminal, and instructs to collect information (S43).

Device management server 40 maintains a terminal ID and positional information of the site terminal, and grasps a current position of each site terminal. Meanwhile, device management server 40 may inquire of the site terminal about the positional information each time, and may acquire the positional information. Device management server 40 narrows down site terminals which are close to the target place using the positional information of the target place (S44), and requests pieces of positional information of the respective terminals with respect to some narrowed-down site terminals (S45). Site terminal 180 which receives the request for the positional information acquires current positional information according to satellite signals which are received by GPS receptor 119 (S46), and returns positional information of each terminal (S47). Device management server 40 notifies Police disposition server 20 about terminal information which includes positional information acquired from each site terminal 180 (S48). The terminal information includes a terminal ID of the site terminal, positional information, and a police officer ID (information of a police officer who is a user of the terminal) which is bound to the terminal ID. The police information as an example of information of a dispatched person may be maintained in the site terminal or may be managed by being maintained in device management server 40. Meanwhile, device management server 40 or Police disposition server 20 may maintain day shift information which includes a work schedule of the police officer and a disposition schedule such as a responsible allocated area in advance, and may associate the terminal ID of the site terminal with police information and manage the terminal ID of the site terminal.

Police disposition server 20 delivers police positional information of a police officer who is close to the incident occurrence location and map information to center device 80 based on terminal information acquired from device management server 40 (S49). In a case where center device 80 receives the police positional information and the map information, center device 80 performs display by superimposing a position of the police officer on the map in the police disposition screen (S50).

Figure 10:
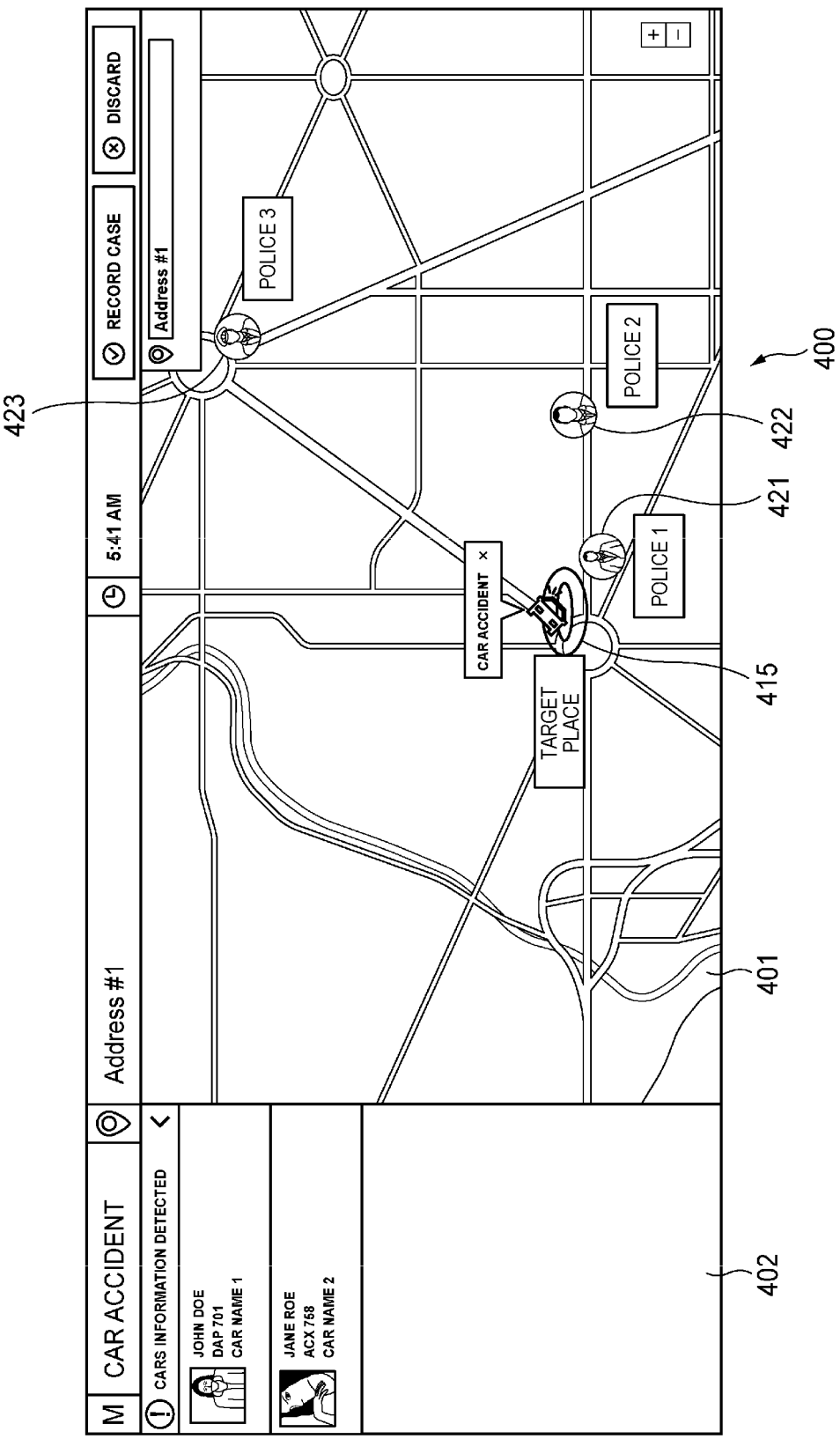
FIG. 10 is a view illustrating an example of a police disposition screen acquired in a case where a target position is registered.

FIG. 10 is a view illustrating an example of the police disposition screen in a case where a target position is registered. Police disposition screen 400, acquired in a case where a target position is registered when an incident occurs, includes map information 401 and incident-related information 402. On the map of map information 401, target place mark 415 which indicates a position of the target place where the incident occurs, and police marks 421, 422, and 423 which indicate positions of police officers are illustrated. The example of the drawing illustrates that a traffic accident occurs as an incident in a location of Address #1 and three police officers police 1, police 2, and police 3 are present in the vicinity of the target place. In police marks 421, 422, and 423, thumbnail images of facial images of the respective police officers are displayed. In a case of the traffic accident, a name of a witness (person involved in the accident), a vehicle number, a vehicle type (a name of a type of the vehicle), and the like are displayed in incident-related information 402.

In FIG. 9, in a case where center device 80 receives manipulation input, which designates a police officer, from a police officer or a person in charge who is a user in the command center 101, center device 80 sends selection input of the police officer to Police disposition server 20 (S51). Police disposition server 20 calculates a path which reaches the target place with respect to the selection input of the police officer based on a current position of the designated police officer, and calculates a needed distance and a needed time until arriving at the target place (S52). Furthermore, Police disposition server 20 delivers the police disposition information related to the designated police officer as dispatched person disposition information, which includes a name of the police officer, current positional information, a needed distance and a needed time up to the target place, to center device 80 (S53). Center device 80 displays the police disposition information received from Police disposition server 20 on the police disposition screen (S54).

Figure 11:
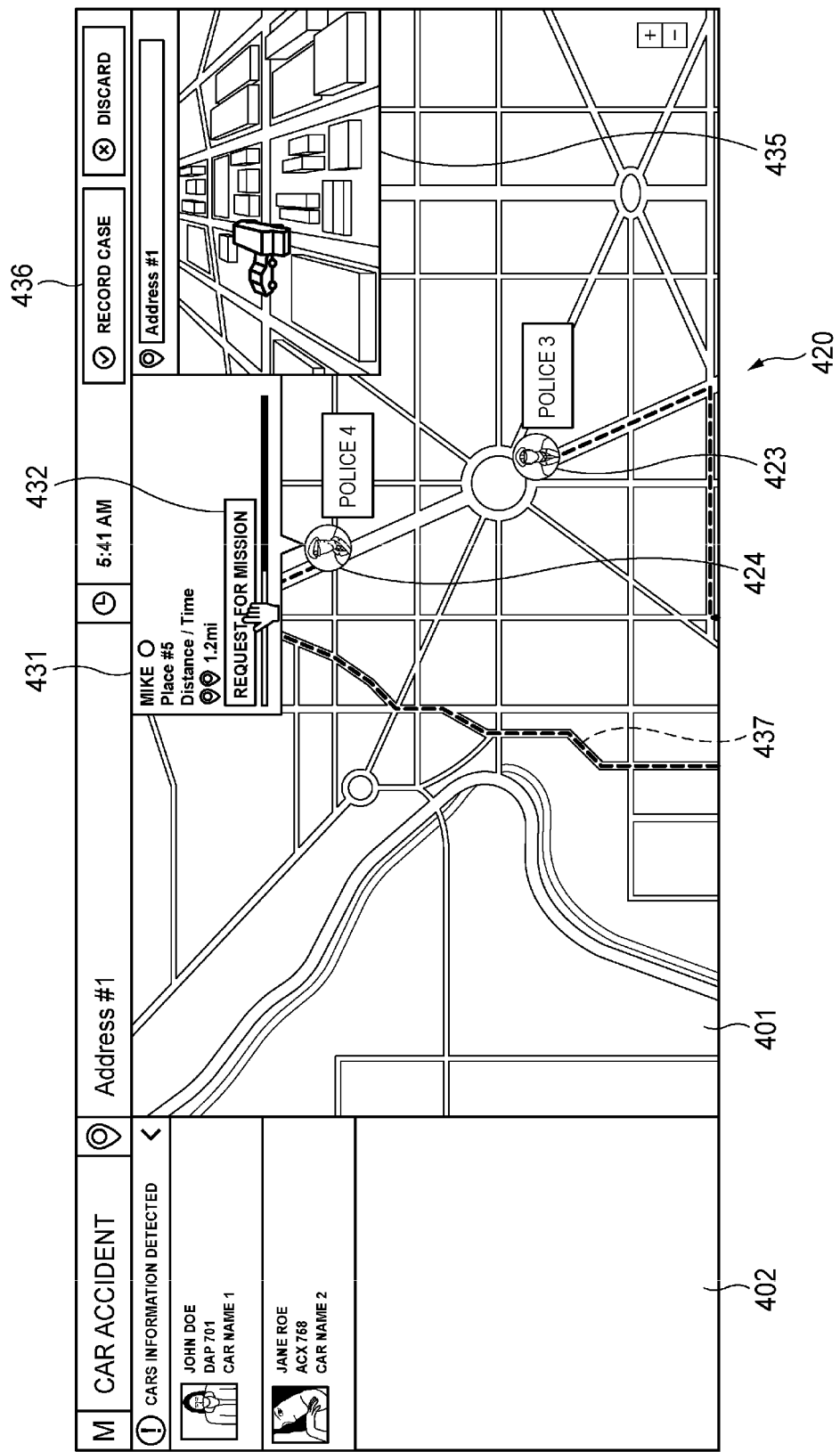
FIG. 11 is a view illustrating an example of the police disposition screen acquired in a case where police disposition information is displayed.

FIG. 11 is a view illustrating an example of the police disposition screen in a case where the police disposition information is displayed. In police disposition screen 420 in a case where the police disposition information is received, police disposition information 431 is displayed to correspond to police mark 424 of the designated police officer (police 4 in the example of the drawing). In police disposition information 431, a name of the police officer (MIKE), a current position (Place #5) of the police officer, a needed distance (Distance), and a needed time (Time) are displayed. In addition, in a lower part of police disposition information 431, an inquiry button (REQUEST FOR MISSION) 432 is provided to inquire whether or not to directly rush to the target place of the incident site. In addition, on the map of map information 401, path information 437 from the current position of the police officer to the target place is displayed. In addition, in an upper right part of police disposition screen 420, a streaming video of incident video 435, which is acquired by imaging an incident occurrence location by monitoring camera 130, wearable camera 150, or the like, is displayed. In an upper part of incident video 435, recording button (RECORD CASE) 436 which instructs video recording is provided. Meanwhile, incident video 435 may be displayed in such a way that Police disposition server 20 interconnects with content management server 10, searches for imaging images in the target place, and acquires the imaging video in the incident occurrence location which coincides with the search condition.

In FIG. 9, in a case where a manipulation of pressing inquiry button 432 with respect to the police officer designated by the user is performed and a manipulation is performed on an inquiry button in order to input a dispatch inquiry (S55), center device 80 sends an instruction for direct rush request check to the police officer to Police disposition server 20 (S56). In a case where Police disposition server 20 receives the instruction for direct rush request check from center device 80, Police disposition server 20 sends the direct rush request check to site terminal 180 which is possessed (used) by the designated police officer through device management server 40 (S57 and S58). Here, Police disposition server 20 sends incident-related information related to the incident which occurs in the target place to site terminal 180. In a case where site terminal 180 receives the direct rush request check, site terminal 180 displays an inquiry screen which notifies that the incident occurs and the direct rush request check with respect to the target place is performed (S59).

Figure 12:
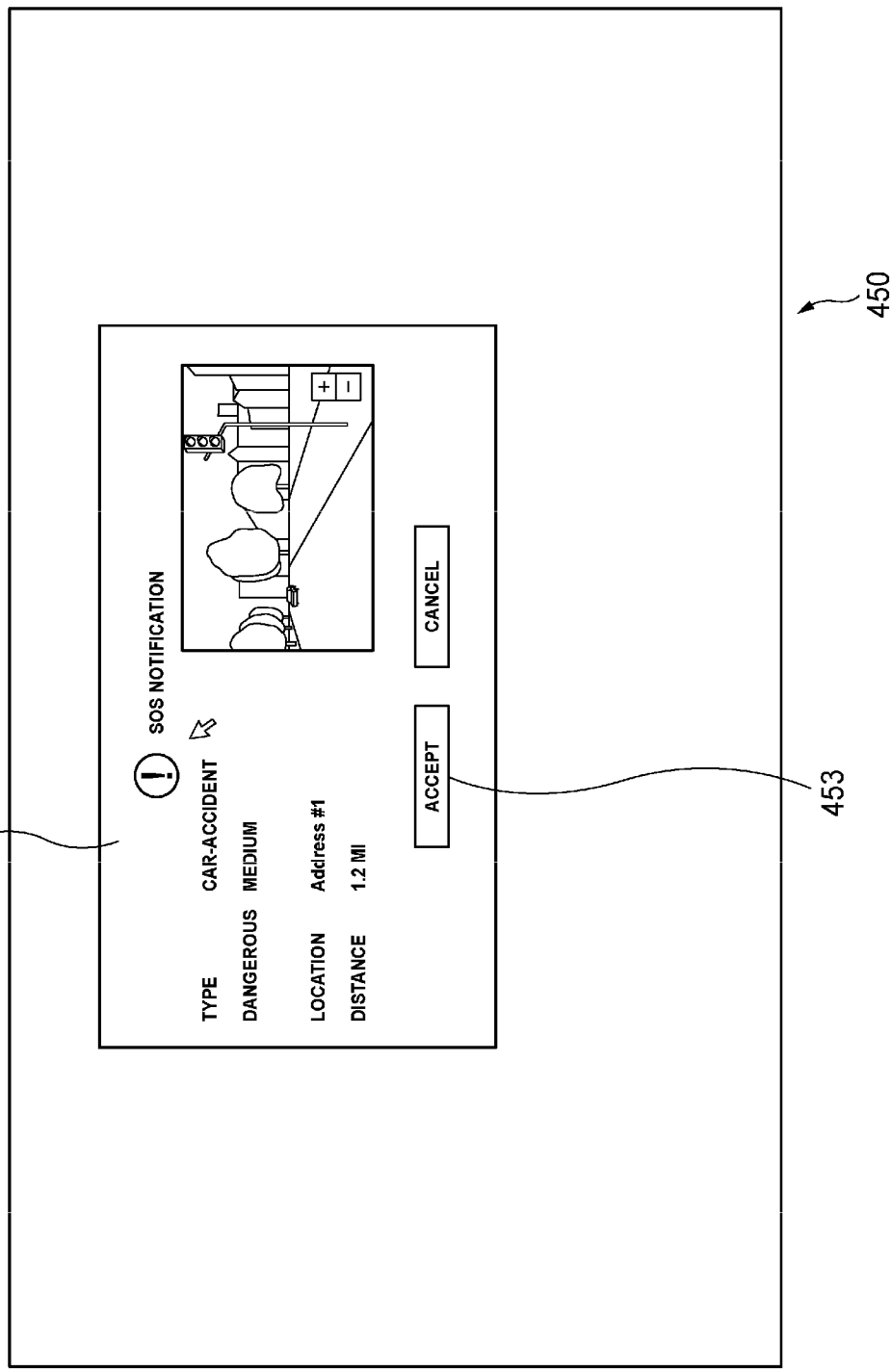
FIG. 12 is a view illustrating an example of an inquiry screen displayed on the site terminal.

FIG. 12 is a view illustrating an example of the inquiry screen which is displayed on the site terminal. In inquiry screen 450, incident-related information 451 relevant to the incident which occurs in the target place and acceptance button (ACCEPT) 453 which receives an inquiry with respect to the direct rush request check with respect to the target place are displayed. In incident-related information 451, an incident type (TYPE), a degree of danger (DANGEROUS), a location (LOCATION), a needed distance (DISTANCE), and the like are displayed. In addition, an imaging video related to the incident occurrence location (ordinary still images, or still images or moving images of a current imaging video) may be displayed as incident-related information 451. The police officer views inquiry screen 450, which is displayed on display 116 of site terminal 180, selects acceptance or rejection with respect to the direct rush request check, and performs manipulation to press acceptance button 453 in a case of acceptance.

In FIG. 12, in a case where an acceptance manipulation is performed in such a way that the police officer who possesses site terminal 180 performs a manipulation to press acceptance button 453 (S60), site terminal 180 sends an acceptance message to Police disposition server 20 through device management server 40 (S61 and S62). In a case where Police disposition server 20 receives the acceptance message from site terminal 180, Police disposition server 20 transmits the acceptance message, which is received from designated police officer, to center device 80 (S63). Center device 80 displays the received acceptance message on the police disposition screen (S64). Meanwhile, in a case of a configuration which enables direct communication, communication between Police disposition server 20 and site terminal 180 may be performed by directly transmitting and receiving inquiry and response without device management server 40. In a case where security is considered, secrecy is more increased in a case where site terminal 180 is capable of communicating with only device management server 40. In addition, instead of an instruction to site terminal 180 through a user manipulation performed on the police disposition screen displayed on display 76, center device 80 may input a command using a voice of a user using microphone 78 and may send the instruction to site terminal 180.

Figure 13:
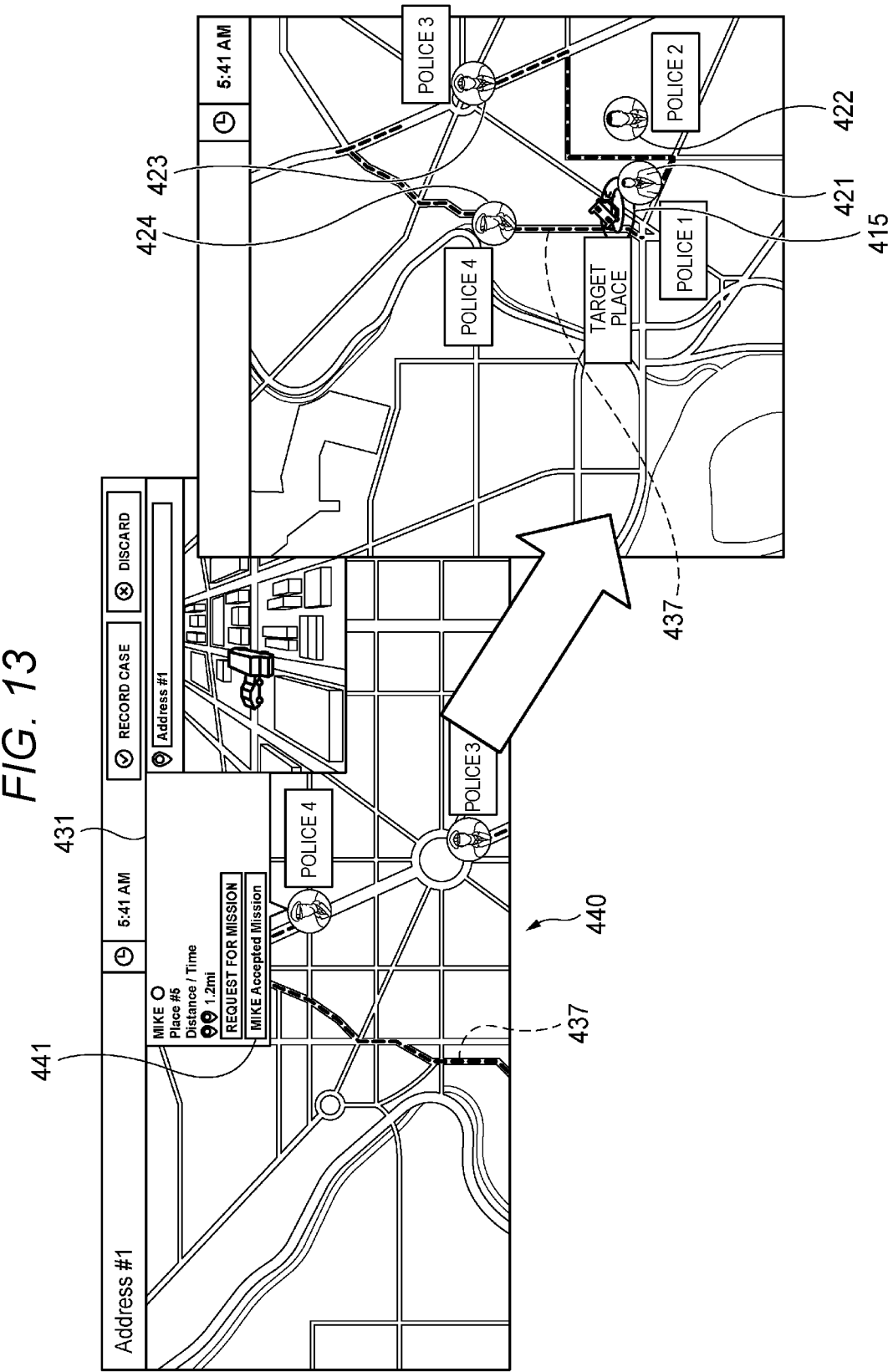
FIG. 13 is a view illustrating an example of the police disposition screen acquired in a case where an acceptance message is received.

FIG. 13 is a view illustrating an example of the police disposition screen in a case where the acceptance message is received. In the case where the acceptance message is received, an acceptance message (MIKE accepted mission) 441 is displayed in a lower part of police disposition information 431 in police disposition screen 440. Furthermore, Police disposition server 20 periodically inquires of device management server 40 about positional information of each site terminal 180 and acquires the positional information of each site terminal 180, updates current police positional information in every prescribed time, and updates a position of each police mark on the map of police disposition screen 440 which is displayed on center device 80. The example of the drawing illustrates a situation in which police 4 indicated by police mark 424 moves toward the target place indicated by target place mark 415 along path information 437. Therefore, it is possible for the user in command center 101 to check whether or not the police officer can rush to the target place.

Figure 14:
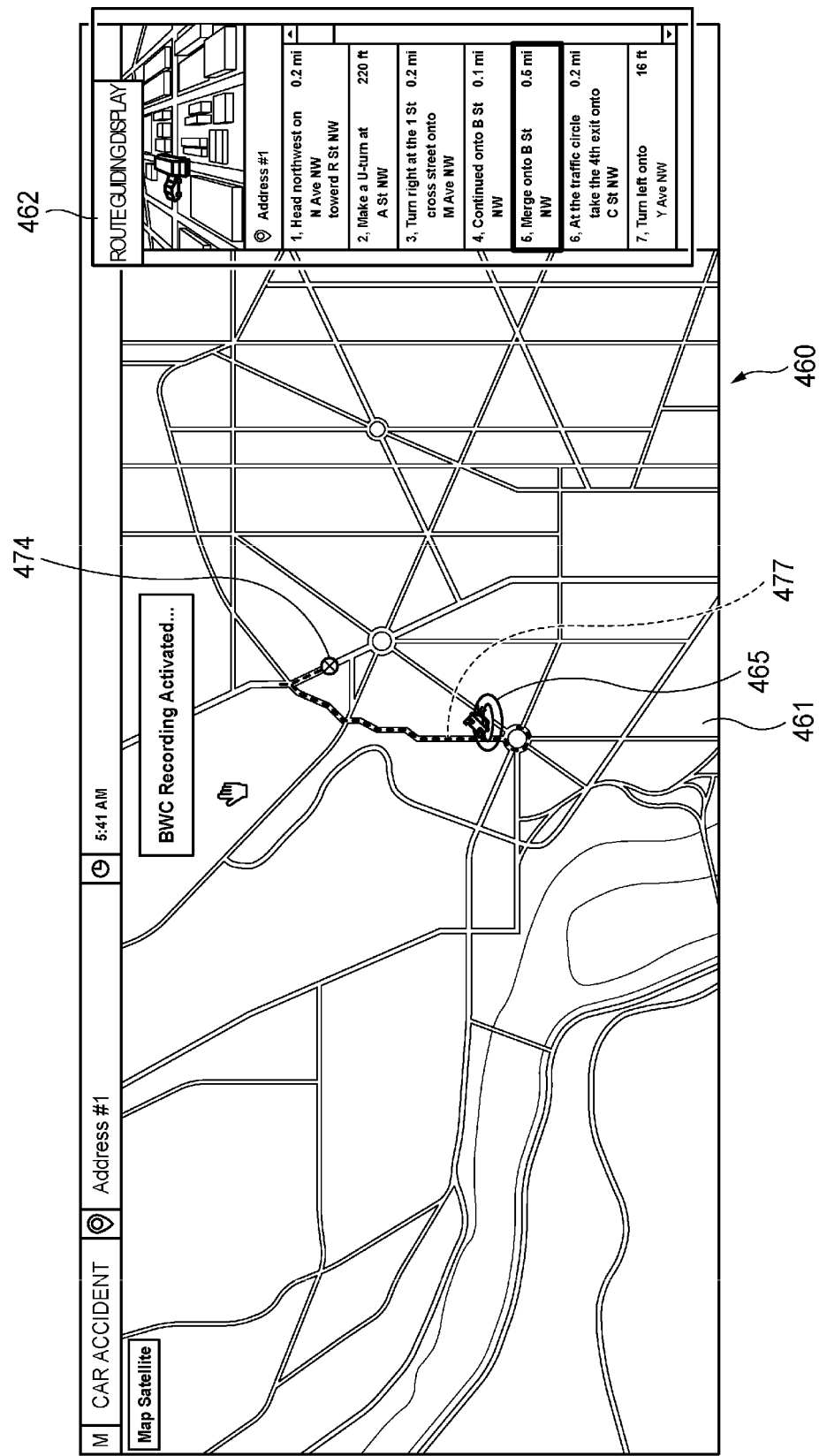
FIG. 14 is a view illustrating an example of a navigation screen displayed on the site terminal.

FIG. 14 is a view illustrating an example of a navigation screen displayed on the site terminal. In a case where Police disposition server 20 receives acceptance message from the site terminal 180, Police disposition server 20 sends navigation information, which includes path information until arriving at the target place, to site terminal 180. In a case where a manipulation to press acceptance button 453 of inquiry screen 450 is performed, site terminal 180 displays navigation screen 460 using the navigation information sent from Police disposition server 20. Navigation screen 460 includes map information 461 and route guiding display 462. On the map of map information 461, target place mark 465, which indicates a position of the target place where the incident occurs, and current position mark 474, which indicates a position of the terminal, are displayed, and path information 477 from a current position of the terminal to the target place is displayed. In route guiding display 462, a path to the target place is indicated using, for example, letter information such as "go straight 5 km in a straight line and turn right 9 km".

As described above, in cases where the positional information of the site terminal in the vicinity of the target place, in which the incident occurs, is acquired, the position of the police officer is displayed on the map, and display of the position of the police office is periodically updated, it is possible to accurately grasp a disposition situation of the police officer. Here, pieces of positional information of the site terminal and the police officer are acquired by efficiently utilizing the device management server, and thus it is possible to check the position of the police officer. In addition, in a case where the positional information of the site terminal or the shift information of the police officer is used, it is possible to accurately narrow down the site terminals and the police officers which are close to the target place. In addition, in a case where the direct rush request check is performed on the site terminal, which is possessed by the designated police officer and whether or not to rush the site is inquired, it is possible to grasp the situation of the police officer. In addition, in a case where the police officer receives the direct rush request, navigation information is sent to the site terminal, and thus it is possible to cause the police officer to accurately rush the incident occurrence location. With the processes, it is possible to dispose the police officer to the incident site more accurately and rapidly.

In the exemplary embodiment, the terminal information, which includes the positional information of the site terminal positioned in the vicinity of the target place of the incident occurrence location and the police officer information bound to the site terminal, is acquired, the positional information of the police officer who is close to the incident occurrence location is superimposed on the map information, and the target place and the position of the police officer are displayed on the map. Therefore, it is possible to easily grasp the position of the police officer in the vicinity of the position of the target place, and it is possible to accurately and rapidly dispatch the police officer to the incident site.

In addition, in the exemplary embodiment, the police disposition information, which includes the needed distance or the needed time from the current position of the designated police officer to the target place, is displayed, and thus it is possible for the designated police officer to check a distance or time, which is necessary to arrive at the target place, and it is possible to accurately and rapidly dispatch the police officer to the incident site.

In addition, in the exemplary embodiment, in a case where the direct rush request check is sent to the site terminal which is used by the police officer and the acceptance message is received from the site terminal, the acceptance message is displayed. Therefore, it is possible to check whether or not the designated police officer can rush the target place, and thus it is possible to accurately and rapidly dispatch the police officer to the incident site.

In addition, in the exemplary embodiment, in a case where the direct rush request check is sent to the site terminal, the incident-related information related to the incident is sent, and, in a case where the acceptance message is received from the site terminal, the navigation information, which includes path information until arriving at the target place, is sent to the site terminal. Therefore, it is possible to support the police officer who possesses the site terminal by notifying incident information and guidance display up to the target place and it is possible to cause the police officer to accurately and rapidly arrive.

In addition, in the exemplary embodiment, in a case where the police disposition information is displayed, the path information from the position of the police officer to the target place is displayed and current positional information of the police officer is updated and displayed in every prescribed time. Therefore, it is possible to grasp the situation in a case where the police officer is rushing the target place.

In addition, in the exemplary embodiment, in a case where the target place and the position of the police officer are displayed, the imaging video related to the incident occurrence location is displayed. Therefore, it is possible to grasp the situation of the incident occurrence location, which is the target place to which the police officer is dispatched, in detail.

Third Exemplary Embodiment

Figure 15:
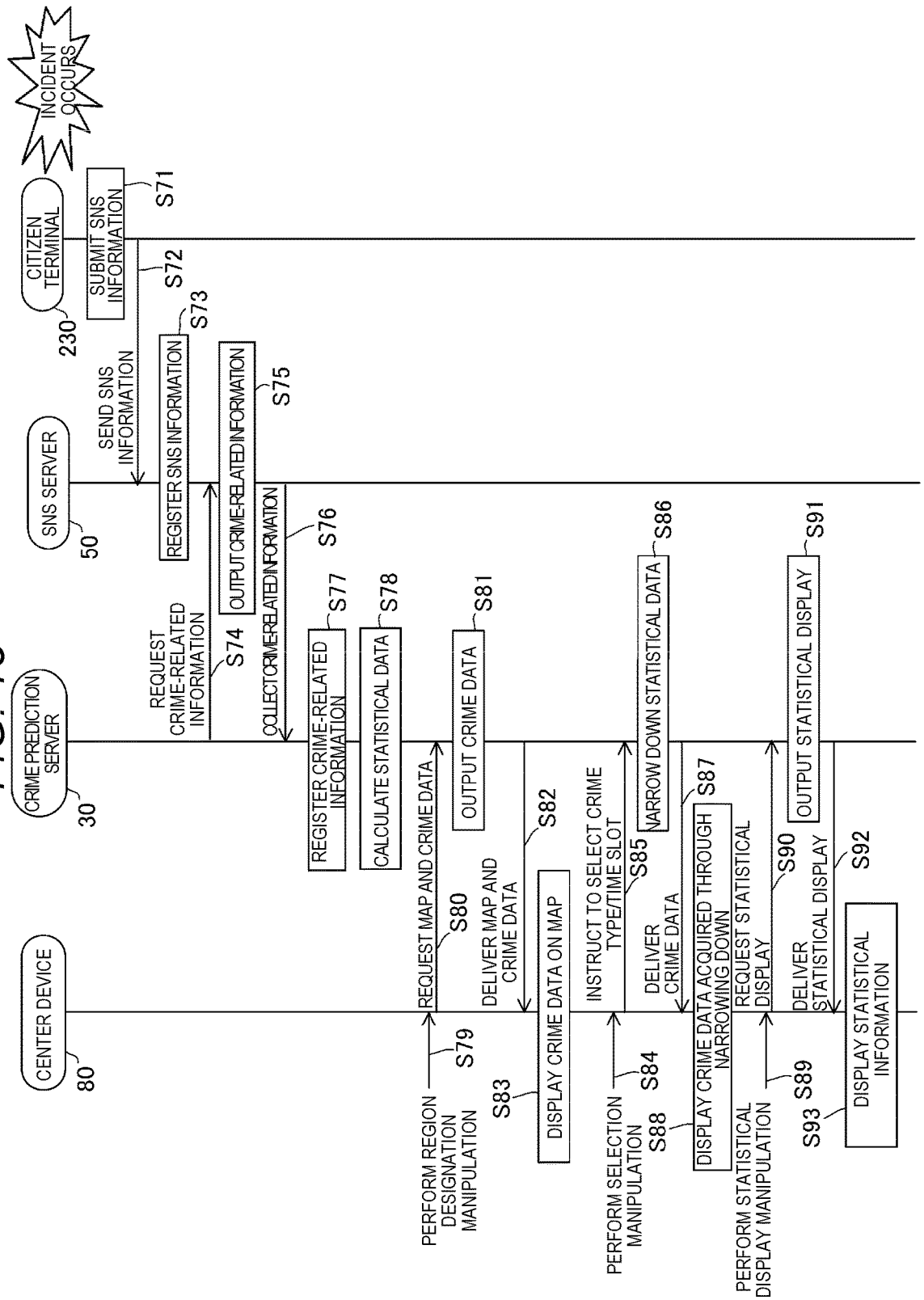
FIG. 15 is a sequence view illustrating an example of an operation procedure of an incident information display process according to a third exemplary embodiment.

An incident information display process of the police work support system will be described as a third exemplary embodiment. A system which performs the incident information display process according to the exemplary embodiment may be formed as an information display system according to the disclosure. In addition, it is possible to prescribe a process procedure in the incident information display system as an information display method according to the disclosure. In the third exemplary embodiment, a process procedure of statistically displaying crime data using a plurality of pieces of crime-related information collected from general citizens is illustrated. FIG. 15 is a sequence view illustrating an example of an operation procedure of the incident information display process according to the third exemplary embodiment. The exemplary embodiment illustrates a procedure performed in a case where incident-related information related to an incident, which occurred within the police jurisdiction, is collected by crime prediction server 30 from SNS server 50 and statistical crime data is displayed in center device 80 such as client PC 70.

In FIG. 15, in a case where an incident occurs, a general citizen in a precinct voluntarily submits incident-related information or other pieces of information to SNS, and reports the incident. Here, citizen terminal 230, such as mobile terminal 210, inputs submission of SNS information according to an information input manipulation performed by the general citizen (S71), and sends the SNS information to SNS server 50 (S72). SNS server 50 receives the SNS information as submission information from citizen terminal 230, and registers the SNS information in the storage (S73).

Crime prediction server 30 periodically or occasionally accesses SNS server 50, and sends a request for the crime-related information (S74). Crime prediction server 30 requests SNS information, which includes crime-related terms indicative of a crime type (homicide, burglaries, or the like), a crime tool (a knife, a gun, or the like), and the like, as the crime-related information. SNS server 50 extracts SNS information, which includes the crime-related terms, from accumulated SNS information in response to the request for the crime-related information, outputs the SNS information (S75), and returns the SNS information to crime prediction server 30 (S76). Therefore, collection of the crime-related information is performed by crime prediction server 30. Crime prediction server 30 registers the collected crime-related information in the storage (S77), calculates statistical data of the crime-related information for respective of various attributes, such as a crime occurrence place, an occurrence hour, a crime type, and a crime tool, and updates the statistical data of the crime-related information (S78). The crime-related information may include crime tool information as a sub-category of the crime type, and the statistical data may be calculated by dividing respective attributes as items.

Center device 80 is capable of displaying a crime-related information display screen, which realizes an incident information display interface, on display 76, and is capable of displaying the crime data and the statistical information thereof according to a user manipulation. In a case where a region designation manipulation of designating a region where a police officer or a person in charge who is the user in command center 101 predicts danger is performed (S79), center device 80 sends a request to deliver map data and crime data to crime prediction server 30 (S80). Crime prediction server 30 refers to positional information of the crime occurrence place for statistical data of accumulated crime-related information, extracts crime data bound to the designated region, and outputs the crime data (S81). Furthermore, crime prediction server 30 superimposes the extracted crime data on map data, and delivers resulting data to center device 80 (S82). Center device 80 displays the crime-related information display screen, in which the crime data is plotted in a position corresponding to the crime occurrence place on the map, on display 76 (S83). Meanwhile, the crime-related information display screen may be displayed using site terminal 180 as the client device instead of center device 80. That is, crime prediction server 30 is capable of being coupled to either center device 80 or site terminal 180 as the client device, and is capable of delivering and displaying the crime-related information display screen on both or one of center device 80 and site terminal 180.

FIG. 16 is a view illustrating an example of the statistical data of the crime-related information. Crime prediction server 30 aggregates the crime-related information collected based on the SNS information for each of the various attributes, such as a crime type and an occurrence hour of an occurred crime, for each crime occurrence place. The example of the drawing illustrates an example of statistical data which is acquired by classifying each of a place A and a place B into a crime type (homicide, burglaries, or the like) and an occurrence hour (morning, afternoon, midnight), and aggregating the data respectively. With the statistical data, it is possible to acquire statistical crime occurrence situation information which indicates a type of a crime occurred in a specific place in a specific time slot.

Figure 17:
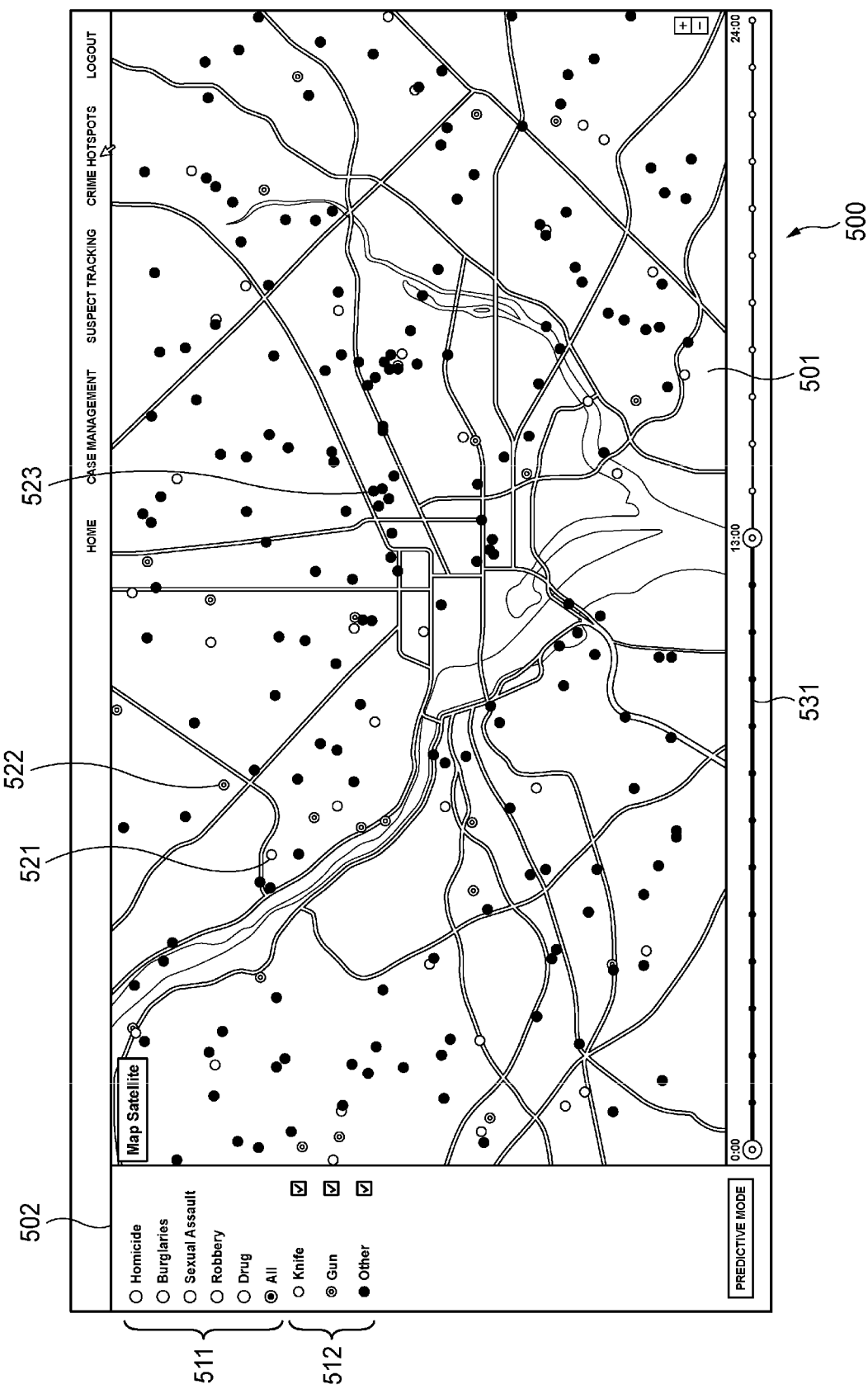
FIG. 17 is a view illustrating a first example of a crime-related information display screen.

FIG. 17 is a view illustrating a first example of the crime-related information display screen. The first example is an example in which crime data in a prescribed region is displayed for each of the plurality of attributes. Crime-related information display screen 500 according to the first example includes map information 501 and crime attribute information 502 which is disposed in a left end part of the screen. In crime attribute information 502, a crime type list (homicide, burglaries, sexual assault, robberies, drug crime, and the like) 511 and a crime tool list (a knife, a gun, others) 512 are displayed as a list, such that the user can select an attribute displayed as the crime data. On the map of map information 501, crime occurrence marks 521, 522, and 523, which are colored for respective attributes, are plotted and displayed in crime occurrence places. In a case where a radio button and a check mark, which are provided besides a crime type list and a crime tool list of crime attribute information 502, are designated as attribute designation inputs by the user, the crime occurrence marks of corresponding attributes are displayed on the map. In a case where the radio button and the check mark are not designated, the crime occurrence marks of the corresponding attributes are not displayed. In a lower end part of map information 501, time slot designation bar 531, which designates a time slot of crime occurrence hours to be displayed, is displayed. In the example of the drawing, crime data in crime occurrence hours of 0:00 to 13:00 is illustrated through designation of time slot designation bar 531.

In FIG. 15, in a case where a manipulation of selecting crime type list 511 or time slot designation bar 531 is performed by designating a crime type or a time slot desired to be displayed on a screen as attribute designation input performed by the user (S84), center device 80 sends an instruction to select the crime type or the time slot to crime prediction server 30 (S85). Crime prediction server 30 performs narrowing-down based on the attributes of the statistical data of the crime-related information according to the instruction to select the crime type or the time slot (S86), and delivers the crime data acquired through narrowing-down to center device 80 (S87). Center device 80 displays the crime-related information display screen, in which the crime data acquired through narrowing-down based on the designated selection condition is plotted on the map, on display 76 (S88).

Figure 18:
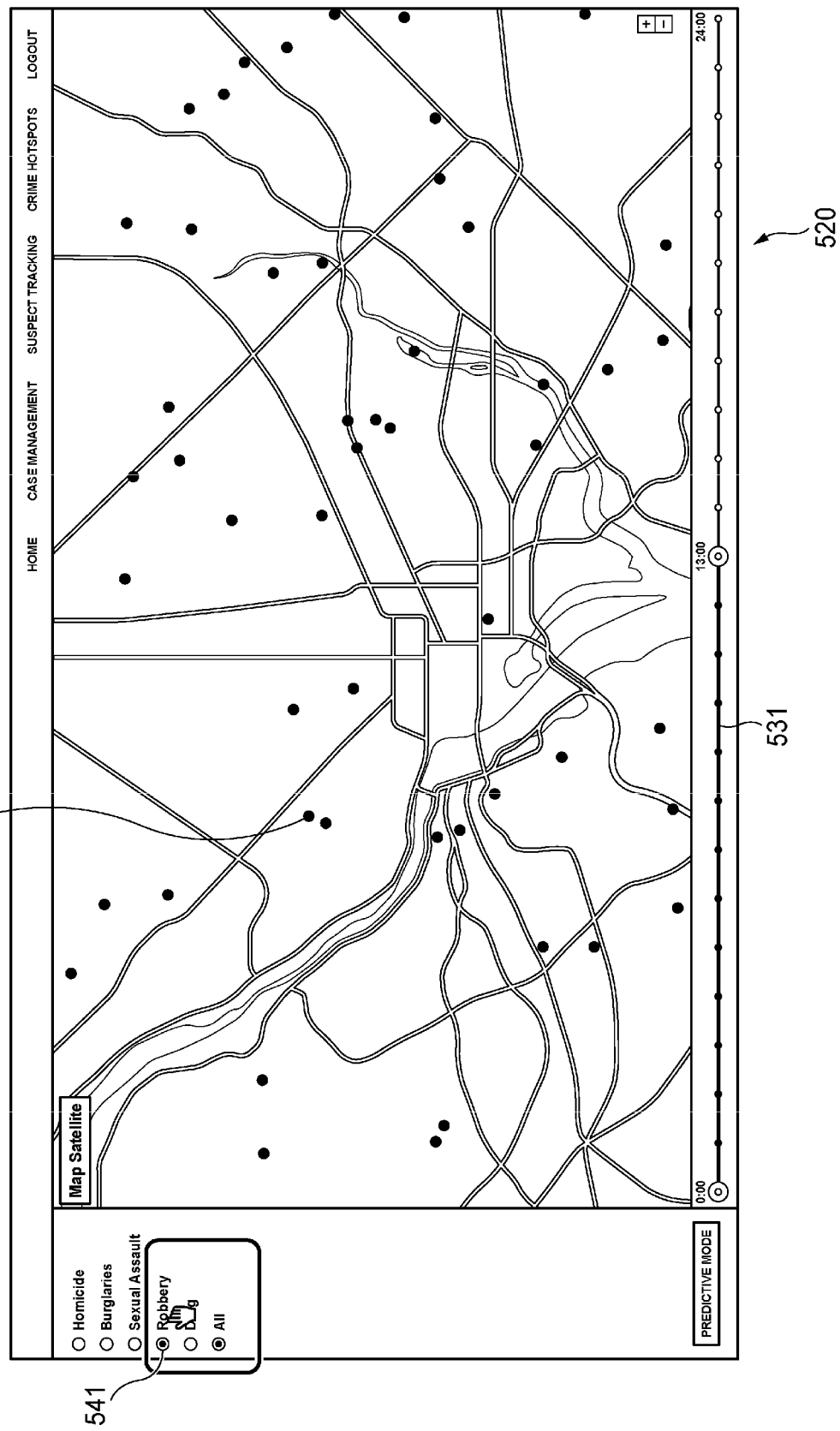
FIG. 18 is a view illustrating a second example of the crime-related information display screen.

FIG. 18 is a view illustrating a second example of the crime-related information display screen. The second example is an example in which crime data in a prescribed region is displayed after being narrowed down to a specific crime type. In crime-related information display screen 520 according to the second example, only crime occurrence mark 545 corresponding to a crime type list 541 of a robbery which is instructed to be selected is displayed on the map. In a case where a crime type and a crime tool, which are desired for the user to display, are selected, it is possible to narrow down the crime data to be plotted and displayed, and it is possible to check an occurrence situation of a specific crime type (robbery in the example of drawing).

Figure 19:
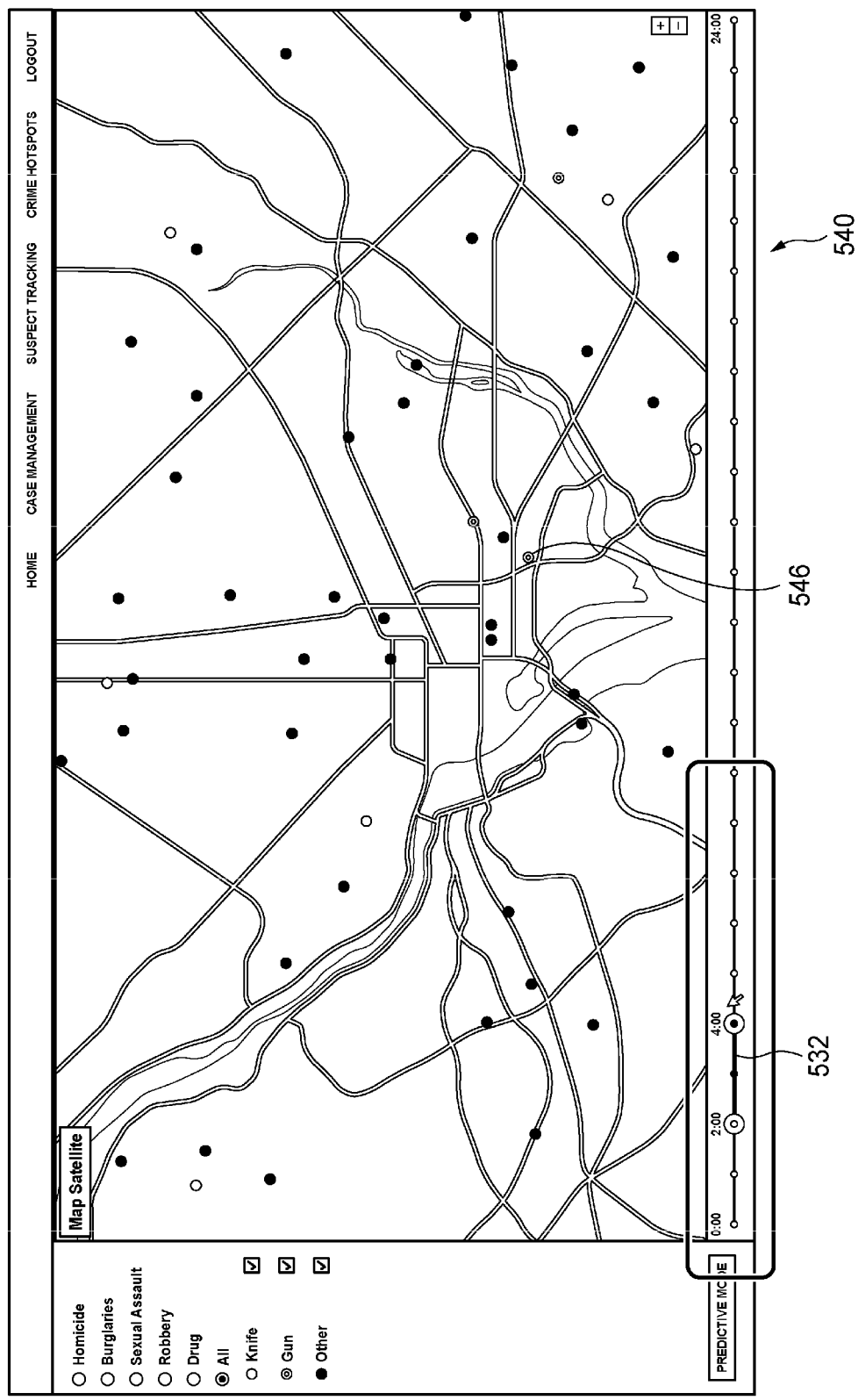
FIG. 19 is a view illustrating a third example of the crime-related information display screen.

FIG. 19 is a view illustrating a third example of the crime-related information display screen. The third example is an example in which the crime data in the prescribed region is displayed after the crime occurrence hours are narrowed down to a specific time slot. In crime-related information display screen 540 according to the third example, only crime occurrence mark 546 in crime occurrence hours of 2:00 to 4:00 is displayed on the map so as to correspond to time slot designation bar 532 of 2:00 to 4:00 in which selection time slots narrow down. In a case where a time slot desired to be displayed is selected by the user, it is possible to cause crime data, which is plotted and displayed, to narrow down, and thus it is possible to check a crime occurrence situation in the specific time slot (midnight in the example of the drawing). As in the display examples of FIG. 18 and FIG. 19, it is possible to display only crime data, which coincides with a relevant crime occurrence condition, and to display statistical data, which is necessary for the crime occurrence prediction, in such a way that the user selects the display attribute.

In FIG. 15, in a case where the user designates a crime occurrence mark of specific crime data whose statistical information is desired to be displayed on the screen and a statistical display manipulation of the designated place is performed in order to instruct statistical display (S89), center device 80 sends a statistical display request to display the statistical information to crime prediction server 30 (S90). In a case where crime prediction server 30 receives the statistical display request, crime prediction server 30 inquires of center device 80 about an axis of a graph including a time axis and a type axis in order to performed statistical display, and outputs statistical display data of statistical information of the crime data which is extracted according to the axis of the graph of a selected display mode (S91), and delivers the statistical display data to center device 80 (S92). Center device 80 displays a statistical information display screen, in which statistical display data of the graph is superimposed on the map, on display 76 (S93).

Figure 20:
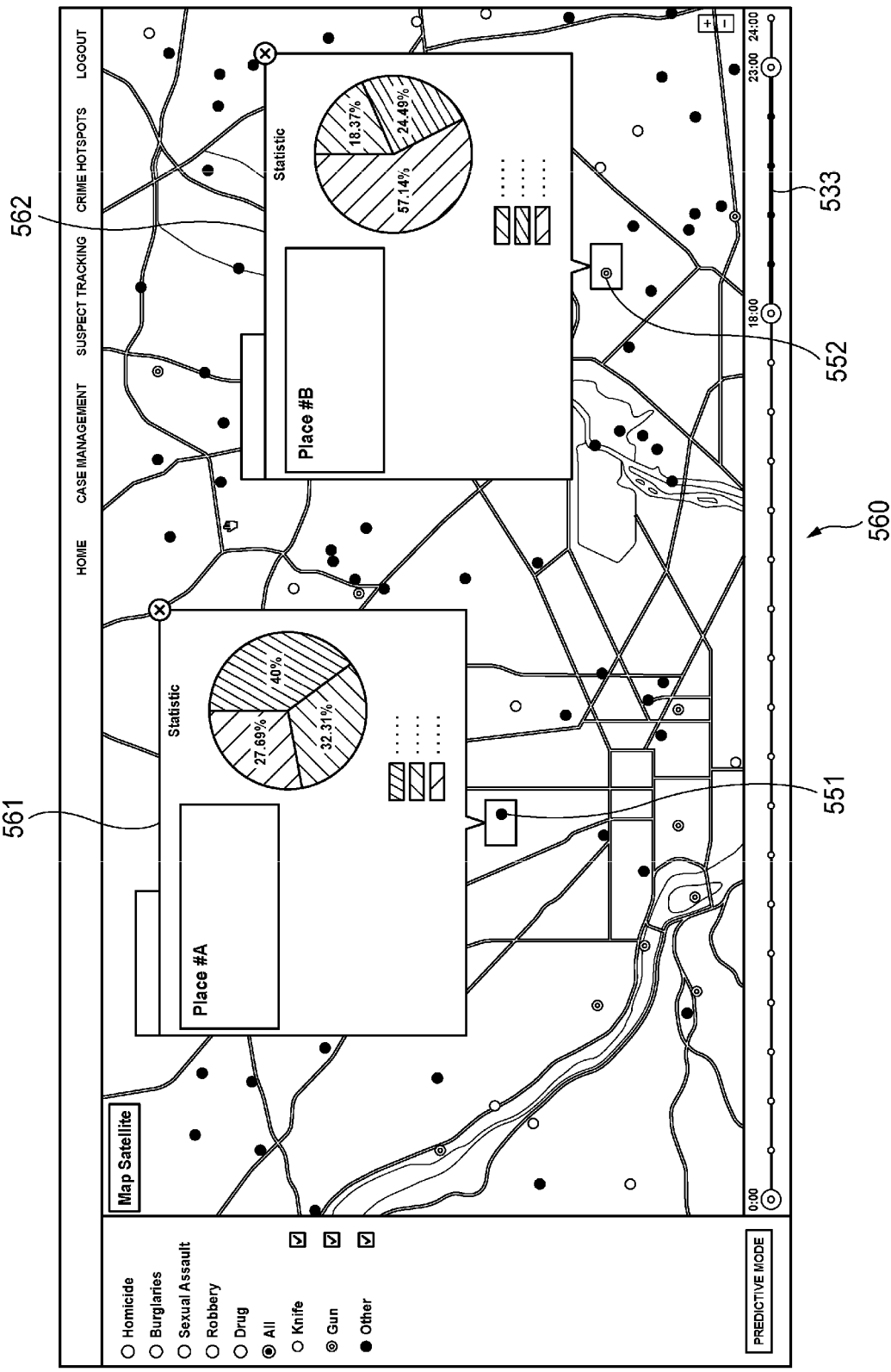
FIG. 20 is a view illustrating an example of a statistical information display screen.

FIG. 20 is a view illustrating an example of the statistical information display screen. In statistical information display screen 560, pieces of statistical information 561 and 562 are displayed which are formed as graphs by statistical display data of crime-related information (crime data) in the respective places with respect to crime occurrence marks 551 and 552 which are plotted on the map. In statistical information display screen 560, it is also possible to narrow down time slots of the crime occurrence hours which are displayed through designation of time slot designation bar 533. The pieces of statistical information 561 and 562 of the example of the drawing are formed as graphs by making crime-related information at specific places be type axes. Ratios of occurrence frequencies for respective crime types with respect to crime data of two spots (Place #A and Place #B) in a time slot, in which the crime occurrence hours of 18:00 to 23:00, are illustrated using pie graphs. Meanwhile, it is possible to perform display in such a way that a graph axis of the graph which is displayed as the statistical information is set to a time axis and an occurrence situation for each time slot with respect to the whole crime type or a specific crime type is formed by a graph.

As described above, in a case where pieces of SNS information which are submitted by a plurality of unspecified citizens are acquired, pieces of crime-related information are collected based on the pieces of SNS information, and statistical data of the pieces of crime-related information is generated for each of the various attributes of an occurred crime, it is possible to acquire data which statistically indicates the crime occurrence situation for each attribute. Here, it is possible to accumulate the statistical data by occasionally incorporating the crime-related information including the crime-related terms from a large amount of information which includes lowly accurate information submitted by general citizens, and it is possible to generate the statistical data, in which the crime-related information is aggregated, using a simple method. In addition, in a case where the crime data divided into categories is superimposed and displayed on the map, it is possible to intuitively determine the crime occurrence situation, and it is possible to predict a crime occurrence tendency for each attribute, such as the crime occurrence place, the crime type, or the occurrence hour. In addition, in a case where the statistical information of the crime-related information is displayed, it is possible to intuitively recognize the crime occurrence situation of each place using the graph, and it is possible to easily grasp the crime occurrence tendency.

With the above-described incident information display process, it is possible to support the crime occurrence prediction performed by a police officer or the like, it is possible to improve the accuracy of the crime occurrence prediction, and it is possible to contribute to reduce crime and to contribute to improve the safety of a region. In addition, it is possible to appropriately set a time slot and a location where the police officer performs patrol by plotting and display on the map, which shows the crime occurrence situation, or using the statistical information, thereby achieving patrol efficiency. Meanwhile, for example, crime prediction server 30 is interconnected with Police disposition server 20, a police officer patrol region and a time slot are determined according to a result of the crime occurrence prediction, and thus it is possible to support preparation of a police officer disposition plan.

In the exemplary embodiment, submission information, which includes the crime-related terms, is collected as the crime-related information from submission information of the general citizens by accessing the SNS server, statistical data with respect to the crime-related information is calculated for each attribute which includes the crime occurrence place, the occurrence hour, and the crime type, the crime data for each attribute is superimposed on the map data, and the crime data is plotted and displayed in a position corresponding to the crime occurrence place on the map. Therefore, it is possible to intuitively determine the crime occurrence situation in a prescribed region, and it is possible to accurately and easily predict the crime occurrence tendency or the like for each attribute using the plurality of pieces of incident-related information.

In addition, in the exemplary embodiment, in a case where the crime data is displayed, crime data is displayed which is narrowed down to a designated attribute according to attribute designation input performed by the user. Therefore, it is possible to check the crime occurrence situation under a specific condition according to the designated attribute, and it is possible to minutely perform the crime occurrence prediction.

In addition, in the exemplary embodiment, in a case where the statistical display data of the crime data is output using a display mode according to the statistical display request, and the statistical information of the crime data is displayed. Therefore, it is possible to intuitively recognize the crime occurrence situation of each place using a graph or the like, it is possible to easily grasp the crime occurrence tendency, and it is possible to improve convenience of the crime occurrence prediction.

Hereinabove, although various exemplary embodiments are described with reference to the drawings, it is apparent that the present disclosure is not limited to the examples. It is apparent that those skilled in the art may arrive various changed examples or modified examples within a category disclosed in the scope of the claims, and it is understood that those changed examples or modified examples naturally belong to the technical scope of the present disclosure. In addition, respective components in the exemplary embodiments may be arbitrarily combined without departing from the gist of the present disclosure.

The invention claimed is:

1. A system for assisting law enforcement to which a server device that collects Social Networking Service (SNS) crime-related information relevant to an incident, a client device that includes a display for displaying the SNS crime-related information, and a police disposition server are coupled,
wherein the server device
accesses an SNS server that accumulates SNS submission information of persons, collects the SNS submission information, which includes crime-related terms, from the SNS submission information as the SNS crime-related information, and records the SNS submission information in a storage,
generates crime data including a crime occurrence place, an occurrence hour, and a crime type of a crime, using the SNS crime-related information, and
sends the crime data and map data, which are generated from the SNS crime-related information, to the client device in response to a request from the client device,
wherein the client device
receives the crime data and the map data, which are sent from the server device, and
superimposes the crime data on the map data, and plots and displays the crime data in a position corresponding to the crime occurrence place on a map, and
wherein the police disposition server dynamically determines a disposition plan for the law enforcement based on the crime data, a work schedule of the law enforcement and a position of a site terminal of the law enforcement.

2. The system of claim 1, wherein the client device displays the crime data, which is narrowed down to a designated crime, in response to according to a crime type designation input by a user in a case where the crime data is displayed.

3. The system of claim 1, where:
the client device sends a statistical display request to the server device in a case where a statistical display instruction is given by a user,
the server device sends statistical display data of the crime data in a display mode in response to the statistical display request to the client device, and
the client device displays statistical information of the crime data based on the received statistical display data on the display.

4. A method in a system for assisting law enforcement to which a server device that collects Social Networking Service (SNS) crime-related information relevant to an incident, a client device that includes a display for displaying the SNS crime-related information, and a police disposition server are coupled, the method comprising:
causing the server device to:
access an SNS server that accumulates SNS submission information of persons, to collect SNS submission information, which includes crime-related terms, from the SNS submission information as the SNS crime-related information, and to record the SNS submission information in a storage,
generate crime data including a crime occurrence place, an occurrence hour, and a crime type of a crime, using the SNS crime-related information, and
send the crime data and map data, which are generated from the SNS crime-related information, to the client device in response to a request from the client device;
causing the client device to:
receive the crime data and the map data, which are sent from the server device, and
superimpose the crime data on the map data, and to plot and display the crime data in a position corresponding to the crime occurrence place on a map; and
causing the police disposition server to:
dynamically determine a disposition plan for the law enforcement based on the crime data, a work schedule of the law enforcement and a position of a site terminal of the law enforcement.

\* \* \* \* \*